US006723784B2

(12) United States Patent
Ito et al.

(10) Patent No.: US 6,723,784 B2
(45) Date of Patent: Apr. 20, 2004

(54) COATING LIQUID, AND IMAGE RECORDING METHOD AND RECORDING USING SAME

(75) Inventors: Fumitsugu Ito, Nagano (JP); Masahiro Yatake, Nagano (JP); Hidehiko Komatsu, Nagano (JP); Hitoshi Ota, Nagano (JP); Kazuhiko Hara, Nagano (JP)

(73) Assignee: Seiko Epson Corporation, Tokyo (JP)

(*) Notice: Subject to any disclaimer, the term of this patent is extended or adjusted under 35 U.S.C. 154(b) by 18 days.

(21) Appl. No.: 09/832,188

(22) Filed: Apr. 10, 2001

(65) Prior Publication Data

US 2002/0009547 A1 Jan. 24, 2002

(30) Foreign Application Priority Data

Apr. 10, 2000 (JP) ....................................... 2000-108356
Oct. 25, 2000 (JP) ....................................... 2000-326069
Oct. 25, 2000 (JP) ....................................... 2000-326076

(51) Int. Cl.[7] ......................... C08L 33/02; C09D 11/10; B41J 2/01

(52) U.S. Cl. .................... 524/556; 523/160; 106/31.57; 106/31.59; 106/31.89; 106/31.85; 347/98; 347/100

(58) Field of Search ................................ 524/556, 577; 523/160, 161; 106/31.27, 31.28, 31.57, 31.59, 31.6, 31.85, 31.89; 525/409; 347/98, 100

(56) References Cited

U.S. PATENT DOCUMENTS

| | | | | | |
|---|---|---|---|---|---|
| 5,640,187 A | * | 6/1997 | Kashiwazaki et al. | ...... | 347/101 |
| 5,746,814 A | | 5/1998 | Malhotra et al. | ............. | 106/18 |
| 5,792,249 A | * | 8/1998 | Shirota et al. | ........... | 106/31.27 |
| 5,993,524 A | * | 11/1999 | Nagai et al. | ............. | 106/31.27 |
| 6,132,502 A | * | 10/2000 | Yatake | ..................... | 106/31.86 |
| 6,419,733 B1 | * | 7/2002 | Sano et al. | .............. | 106/31.86 |

FOREIGN PATENT DOCUMENTS

| | | |
|---|---|---|
| EP | 0322755 | 7/1989 |
| EP | 0751009 | 1/1997 |
| EP | 0753552 | 1/1997 |
| EP | 832741 A2 * | 4/1998 |
| EP | 0842994 | 5/1998 |
| EP | 0978547 | 2/2000 |
| EP | 1022151 A1 * | 7/2000 |
| JP | 59104974 | 6/1984 |
| JP | 62101482 | 5/1987 |
| JP | 1141782 | 6/1989 |
| JP | 280279 | 3/1990 |
| JP | 6115066 | 4/1994 |
| JP | 83498 | 1/1996 |
| JP | 8283598 | 10/1996 |
| JP | 9262971 | 10/1997 |
| JP | 10110110 | 4/1998 |
| JP | 10110111 | 4/1998 |
| JP | 10195331 | 7/1998 |
| JP | 10195360 | 7/1998 |
| JP | 10237349 | 9/1998 |
| JP | 10330665 | 12/1998 |
| WO | 0006390 | 2/2000 |

OTHER PUBLICATIONS

Patent Abstracts of Japan Publication No. 10330665 A dated Dec. 15, 1998.
Patent Abstracts of Japan Publication No. 08003498 A dated Jan. 9, 1996.
Patent Abstracts of Japan Publication No. 10195331 A dated Jul. 28, 1998.
Patent Abstracts of Japan Publication No. 10237349 A dated Sep. 8, 1998.
Patent Abstracts of Japan Publication No. 08283598 A dated Oct. 29, 1996.
Patent Abstracts of Japan Publication No. 10110110 A dated Apr. 28, 1998.
Patent Abstracts of Japan Publication No. 10110111 A dated Apr. 28, 1998.
Patent Abstracts of Japan Publication No. 59104974 A dated Jun. 18, 1984.
Patent Abstracts of Japan Publication No. 62101482 A dated May 11, 1987.
Patent Abstracts of Japan Publication No. 01141782 A dated Jun. 2, 1989.
Patent Abstracts of Japan Publication No. 02080279 A dated Mar. 20, 1990.
Patent Abstracts of Japan Publication No. 06115066 A dated Apr. 26, 1994.
Patent Abstracts of Japan Publication No. 09262971 A dated Oct. 7, 1997.
Patent Abstrats of Japan Publication No. 10195360 A dated Jul. 28, 1998.

* cited by examiner

*Primary Examiner*—Callie Shosho
(74) *Attorney, Agent, or Firm*—Ladas & Parry

(57) ABSTRACT

A coating liquid for forming a transparent topcoat, without requiring a hardening or fixing process that uses heating or UV radiation. The coating liquid imparts light resistance, water resistance, fixation, and glossiness to recordings. Also, a recording method using the coating liquid, and recordings produced thereby. The liquid, which is applied to recorded images, contains at least water, fine polymer particles, and a penetrating agent, preferably a penetrating agent selected acetylene glycol surfactants, acetylene alcohol surfactants, glycol ethers, and 1,2-alkylene glycols. Also, an image recording method for forming an even, transparent coating layer by spraying the coating liquid during an ink jet recording process, as well as recordings produced thereby.

43 Claims, No Drawings

COATING LIQUID, AND IMAGE RECORDING METHOD AND RECORDING USING SAME

BACKGROUND OF THE INVENTION

1. Field of the Invention

This invention relates to a coating liquid used in methods for coating recorded images, to an image recording method using that coating liquid, and to a recordings recorded therewith.

2. Description of the Related Art

Conventionally, the method of coating a recorded image with a laminate film is practiced as a method for protecting the recorded image and enhancing the bond between the recorded image and the base material. With this method, however, because separate process steps are required for supplying the laminate film, coating, and pressure application and the like, the apparatus itself becomes complex. With further innovations needed to effect suitable coatings, in Japanese Patent Application Laid-Open No. S59-104974/1984 (published), an apparatus is proposed for effecting good and suitable laminate coatings by the new addition, to the process, of an apparatus for detecting laminate film layer displacement. With this, however, the apparatus becomes even larger and more complex.

Ink jet recording, on the other hand, is a method wherewith text or graphics are recorded on the surface of a recording medium by ejecting small droplets of ink from very small nozzles. The ink jet recording procedures being implemented in practice include a method wherewith electrical signals are converted to mechanical signals using an electrostriction transducer, and ink stored in a nozzle head portion is discharged intermittently and text or symbols are recorded on the surface of a recording medium, and a method wherewith a part extremely close to the portion ejecting the ink stored in the nozzle head portion is rapidly heated to generate bubbles, intermittent ejection is effected by the cubical expansion of those bubbles, and text or symbols are recorded on the surface of a recording medium.

The recording liquids used in ink jet recording are mostly water-based in the interest of safety and recording properties, with water soluble dyes frequently used in the coloring agents, as a result of which these suffer the shortcoming of exhibiting inferior light resistance and water resistance. For that reason, various studies have been done on the use of pigments for the coloring agents with the object of gaining light resistance and water resistance in the recordings. With conventional methods, however, the fixation of the pigments to the recording medium is inadequate, which results in problems such as the paper smudging when rubbed with a finger, or a recorded portion becoming unsightly if the recording is marked with a so-called magic marker. Another problem therewith is inadequate glossiness.

As a separate measure, providing a protective coating layer to recordings recorded with ink jet recording procedures has been proposed for some time as a method for improving water resistance, fixation, and glossiness. In Japanese Patent Application Laid-Open No. S62-101482/1907 (published), for example, a method for fusion-transferring a thermally fusing coating agent onto a recorded image is investigated as a method for imparting water resistance to recordings colored with water soluble dye inks. In Japanese Patent Application Laid-Open No. H1-141782/1989 (published) and Japanese Patent Application Laid-Open No. H2-80279/1990 (published), a method is proposed for applying a liquid containing an isocyanate compound to a recorded image, and hardening it, to form a protective coating layer. In Japanese Patent Application Laid-Open No. H6-115066/1994 (published), a method in proposed wherewith high-quality recordings exhibiting outstanding bonding can be effected by forming a transparent topcoat layer after recording with an ink jet recording procedure on an ink absorption layer. And in Japanese Patent Application Laid-Open No. H9-262971/1997 (published), a printer is proposed wherewith, by spraying and fixing a laminate agent for laminating the recorded surface of a recording medium, recordings are obtained which can stand up under outdoor use. When such methods are used, however, the laminating apparatus itself is complex, or a hardening and fixing process using heat or UV radiation is required when forming the topcoat layer, or a separate process step is required for applying the film under pressure.

From the perspective of recording light resistance and water resistance, moreover, when a pigment like carbon black or the like is used for the colorant, dispersion in the ink is poor, clogging occurs, and pigment agglomeration occurs during storage, wherefore various kinds of dispersants have been studied. However, when these various dispersants such, for example, as resin dispersants, are merely added, those dispersants induce dispersion by adsorbing to the surface of the pigment particles, but the dispersants become detached from the surface of the pigment particles due to some causative factor or other, wherefore satisfactory dispersing effects have not been obtained. In cases where penetrating agents are added into the ink composition to impart a strong penetrating effect in order to increase the recorded image drying speed, in particular, dispersion stability sometimes deteriorates even more, a phenomenon thought to be caused by dispersant detachment being thereby promoted.

Thereupon, so-called self-dispersing surface-treated pigments (hereinafter called "surface-treated pigments") have been proposed which improve pigment dispersion by subjecting the pigment particles to a surface treatment and thereby make it possible to disperse and/or dissolve the pigment particles in water without a dispersant. In Japanese Patent Application Laid-Open No. H10-195360/1998 (published) and Japanese Patent Application Laid-Open No. H10 330665/1998 (published), for example, self-dispersing carbon black is disclosed wherein a hydrophilic group such as the carboxyl group, carbonyl group, sulfone group, or hydroxyl group is bonded to the surface of the carbon black, either directly or with another atom group intervening. In Japanese Patent Application Laid-Open No. H8-3498/1996 (published), Japanese Patent Application Laid-Open No. H10-195331/1998 (published), and Japanese Patent Application Laid-Open No. H10-237349/1998 (published), for example, subjecting the surface of carbon black to an oxidation treatment to improve dispersion properties is proposed. And in Japanese Patent Application Laid-Open No. H8-283598/1996 (published), Japanese Patent Application laid-Open No. H10-110110/1998 (published), and Japanese Patent Application Laid-Open No. H10-110111/1998 (published), for example, surface-treated pigments are proposed wherein sulfone groups are inducted to the surfaces of organic pigments.

By using such surface-treated pigments as these in inks, it is possible to reduce the contained quantities of dispersants such as the resin dispersants conventionally used, or to avoid using such altogether. As a consequence, the solid matter content in ink compositions can be reduced, wherefore the viscosity of ink compositions can be lowered, the occurrence of clogging suppressed, and limitations on additives relaxed. Thus it is known that surfactants can be added to make fast-drying inks that penetrate faster into the recording medium, that the pigment content can be increased by the measure that the dispersant content can be reduced, and that, therefore, high image quality can be achieved with enhanced coloration.

Nevertheless, although it is possible to raise the image density on the recording medium and obtain high picture quality by increasing the pigment content in inks, new problems have arisen in that fixation or rubbing resistance deteriorates. Such decline in fixation and/or rubbing resistance is particularly conspicuous in glossy recording mediums having smooth surfaces.

SUMMARY OF THE INVENTION

Thereupon, an object of the present invention is to provide a coating liquid that does not require hardening or fixing processes using heat or UV radiation or the like, and also a recording method that, by coating that coating liquid with an ink jet recording procedure, imparts recording fastness in terms of light resistance, water resistance, and fixation, etc., and good image quality with outstanding glossiness, together with recordings recorded thereby.

Another object of the present invention is to provide a recording method wherein that coating liquid is used, wherewith, by using a surface-treated pigment as the pigment, recording can be performed with high image density and high picture quality, exhibiting rapid drying in addition to the proportion noted above, and wherewith fixation and rubbing resistance can be improved, together with recordings recorded thereby.

The inventors, as a result of intense investigations in an effort to resolve the problems noted in the foregoing, discovered that by controlling the penetrability of the coating liquid, recorded images are dried and fixed without requiring processes such as heating or hardening after coating on the coating liquid, and that recorded images exhibiting outstanding light resistance, water resistance, fixation, and image glossiness are thereby obtained, and thus have come to propose the present invention.

The present invention, specifically, is a coating liquid for application to recorded images containing at least water, fine polymer particles, and a penetrating agent. By providing this coating liquid, an object or objects noted earlier are attained.

The present invention also provides the coating liquid noted above wherein the surface tension in that coating liquid at 20° C. is 40 mN/m.

The present invention is the coating liquid described above, wherein the penetrating agent is one or more substances selected from a group consisting of an acetylene glycol surfactant, an acetylene alcohol surfactant, a glycol ether, and a 1,2-alkylene glycol.

The present invention also provides the coating liquid described above, wherein the penetrating agent is an acetylene glycol surfactant and/or an acetylene alcohol surfactant, such acetylene glycol surfactant is one to which on average 30 or fewer ethylene oxy groups and/or propylene oxy groups are added to 2,4,7,9-tetramethyl-5-decine-4,7-diol, 3,6-dimetyl-4-octine-3,6-diol, or 2,4,7,9-tetramethyl-5-decine-4,7-diol, 3,6-dimethyl-4-octine-3,6-diol, and such acetylene alcohol surfactant is one to which on average 30 or fewer ethylene oxy groups and/or propylene oxy groups are added to 2,4-dimethyl-5-hexine-3-ol or 2,4-dimethyl-5-hexine-3-ol.

The present invention also provides the coating liquid described above, wherein the penetrating agent is a glycol ether, and that glycol ether is ethylene glycol mono(alkyl having 4 to 8 carbons) ether, triethylene glycol mono(alkyl having 4 to 8 carbons) ether, propylene glycol mono(alkyl having 3 to 6 carbons), or dipropylene glycol mono(alkyl having 3 to 6 carbons) ether.

The present invention also provides the coating liquid described above, wherein the penetrating agent is a 1,2-alkylene glycol, and that 1,2-alkylene glycol is a 1,2-(alkyl having 4 to 10 carbons) diol.

The present invention also provides the coating liquid described above, wherein the amount of the fine polymer particles contained is within a range of 1 to 40 wt. %.

The present invention also provides the coating liquid described above, wherein the minimum film formation temperature for the fine polymer particles is room temperature.

The present invention also provides the coating liquid described above, wherein the fine polymer particles are used as an aqueous emulsion configured only of a resin or resins having an acid value of 100 or less.

The present invention also provides the coating liquid described above, wherein the penetrating agent is an ethylene glycol surfactant and/or acetylene alcohol surfactant contained in an amount of 0.1 to 5.0 wt. %.

The present invention also provides the coating liquid described above, wherein the penetrating agent is a glycol ether contained in an amount of 0.5 to 30 wt. %.

The present invention also provides the coating liquid described above, wherein the penetrating agent is a 1,2-acetylene glycol contained in an amount of 0.5 to 30 wt. %.

The present invention also provides the coating liquid described above, containing at least one substance having the structure represented in formula (I) below.

$$\text{R-EOn-POm-X} \qquad \text{(I)}$$

(where R represents an alkyl group having 1 to 12 carbons, the structure whereof may be either a straight chain or branching; X represents —H or —$SO_3M$ (where M is a counter ion that is hydrogen ion, alkaline metal ion, ammonium ion, or organic ammonium ion); EO represents an ethylene oxy group; PO represents a propylene oxy group; and n and m are repeating units, indicating mean values in one of the substances expressed in formula (I). EO and PO indicate presence in the molecule, with the order thereof being irrelevant.)

The present invention also provides the coating liquid described above, wherein R indicated in formula (I) above is an alkyl group having 4 to 10 carbons.

The present invention also provides the coating liquid described above, wherein the substance expressed in formula (I) above is one wherein R is a butyl group, pentyl group, hexyl group, heptyl group, octyl group, nonyl group, or decyl group.

The present invention also provides the coating liquid described above, wherein the substance expressed in formula (I) above has as its main component at least one substance expressed in formula (I) wherein R is a butyl group selected from among the n-butyl, isobutyl, and t-butyl groups, or has as its main component at least one substance expressed in formula (I) wherein R is a pentyl group selected from among the n-pentyl group and other isomers, or has as its main component at least one substance expressed in formula (I) wherein R is a hexyl group selected from among the n-hexyl group and other isomers, or has as its main component at least one substance expressed in formula (I) wherein R is a heptyl group selected from among the n-heptyl group and other isomers, or has as its main component at least one substance expressed in formula (I) wherein R is an octyl group selected from among the n-octyl group and other isomers, or has as its main component at least one substance expressed in formula (I) wherein R is a nonyl group selected from among the n-nonyl group and other isomers, or has as its main component at least one substance expressed in formula (I) wherein R is a decyl group selected from among the n-decyl group and other isomers.

The present invention also provides the coating liquid described above, wherein the substance expressed in formula (I) above is one wherein n is 0 to 10, and m is 1 to 5.

The present invention also provides the coating liquid described above, wherein the substance expressed in formula (I) above has an average molecular weight of 2,000 or less.

The present invention also provides the coating liquid described above, wherein the substance expressed in formula (I) above is contained in an amount of 0.5 to 30 wt. %.

The present invention also attains an object or objects noted earlier by providing an image recording method wherein the coating liquid described above is discharged onto at least the image portion of a recording medium using an ink jet head to form a coating.

The present invention also provides the image recording method described above, wherein the image to which the coat is applied was formed by discharging an ink composition onto a recording medium using an ink jet head.

The present invention also provides the image recording method described above, wherein the ink composition contains at least water, a colorant, and a penetrating agent.

The present invention also provides the image recording method described above wherein the colorant is a dye.

The present invention also provides the image recording method described above wherein the colorant is a pigment.

The present invention also provides the image recording method described above wherein the pigment is made one that is capable of being dispersed and/or dissolved in water by a dispersant.

The present invention also provides the image recording method described above wherein the pigment is surface-treated so that at least one of the functional groups represented below, or salt thereof, is bonded either directly or with a polyvalent group intervening, to the surface thereof, and is made capable of being dispersed and/or dissolved in water without a dispersant;

—OM, —COOM, —CO—, —$SO_3M$, —$SO_2NH_2$, —$RSO_2M$, —$PO_3HM$, —$PO_3M_2$, —$SO_2NHCOR$, —$NH_3$, —$NR_3$ (where M is a hydrogen atom, alkaline metal, ammonium, or organic ammonium, and R is an alkyl group having 1 to 12 carbons, a phenyl group that may have a substituent group, or a naphthyl group that may have a substituent group).

The image recording method described above, wherein the polyvalent group is an alkyl group, a phenyl group that may have a substituent group, or a naphthyl group that may have a substituent group, having 1 to 12 carbons.

The present invention also provides the image recording method described above wherein the pigment is surface treated with a treatment agent containing sulfur so that $SO_3M$ and/or —$RSO_2M$ (where M is a counter ion that is a hydrogen ion, alkaline metal ion, an ammonium ion, or an organic ammonium ion) is chemically bonded to the surface of the particles thereof, and made capable of dispersing and/or dissolving in water.

The present invention also provides the image recording method described above, wherein the liquid in which the surface-treated pigment is dispersed exhibits a zeta potential having an absolute value of 30 mv or greater at 20° C. and pH 8 to 9.

The present invention also provides the image recording method described above wherein the surface tension of the ink composition at 20 C. is 40 mN/m or less.

The present invention also provides the image recording method described above wherein the penetrating agent is one or more substance selected from among a group comprising acetylene glycol surfactants, acetylene alcohol surfactants, glycol ethers, and 1,2-alkylene glycols.

The present invention also provides the image recording method described above wherein the penetrating agent is an acetylene glycol surfactant and/or an acetylene alcohol surfactant, such acetylene glycol surfactant is one to which on average 30 or fewer ethylene oxy groups and/or propylene oxy groups are added to 2,4,7,9-tetramethyl-5-decine-4,7-diol, 3,6-dimetyl 4-octine-3,6-diol, or 2,4,7,9-tetramethyl-5-decine-4,7-diol, 3,6-dimethyl-4-octine-3,6-diol, and such acetylene alcohol surfactant is one to which on average 30 or fewer ethylene oxy groups and/or propylene oxy groups are added to 2,4-dimethyl-5-hexine-3-ol or 2,4-dimethyl-5-hexine-3-ol.

The present invention also provides the image recording method described above, wherein the penetrating agent is a glycol ether, and that glycol ether is ethylene glycol mono (alkyl having 4 to 8 carbons) ether, triethylene glycol mono(alkyl having 4 to 8 carbons) ether, propylene glycol mono(alkyl having 3 to 6 carbons), or dipropylene glycol mono(alkyl having 3 to 6 carbons) ether.

The present invention also provides the image recording method described above, wherein the penetrating agent is a 1,2-alkylene glycol, and that 1,2-alkylene glycol is a 1,2-(alkyl having 4 to 10 carbons) diol.

The present invention also provides the image recording method described above wherein the penetrating agent is an acetylene glycol surfactant of acetylene alcohol surfactant the contained amount whereof is 0.1 to 3.0 wt. %.

The present invention also provides the image recording method described above wherein the penetrating agent is a glycol ether, the contained amount whereof is 0.5 to 30 wt. %.

The present invention also provides the image recording method described above wherein the penetrating agent is a 1,2-alkylene glycol the contained amount whereof is 0.5 to 30 wt. %.

The present invention also provides the image recording method described above wherein at least one substance having the structure represented by formula (I) below is contained in the ink composition:

$$R\text{-}EOn\text{-}POm\text{-}X \qquad (I)$$

(where R is an alkyl group having 1 to 12 carbons, the structure whereof is a straight chain or branched structure, X is —H or $SO_3M$ (where M is a counter ion that is a hydrogen ion, alkaline metal ion, ammonium ion, or organic ammonium ion), EO is an ethylene oxy group, PO is a propylene oxy group, and n and m are repeating units, representing mean values in one of the substances expressed in formula (I). EO and PO indicate presence in the molecule, with the order thereof being irrelevant.)

The present invention also provides the image recording method described above wherein the R in the formula (I) is an alkyl group having 4 to 10 carbons.

The present invention also provides the image recording method described above wherein, in the substance expressed by the formula (I), R is a butyl group, pentyl group, hexyl group, heptyl group, octyl group, nonyl group, or decyl group.

The present invention also provides the image recording method described above wherein the substance expressed in formula (I) above has as its main component at least one substance expressed in formula (I) wherein R is a butyl group selected from among the n-butyl, isobutyl, and t-butyl groups, or has as its main component at least one substance expressed in formula (I) wherein R is a pentyl group selected from among the n-pentyl group and other isomers, or has as its main component at least one substance expressed in formula (I) wherein R is a hexyl group selected from among the n-hexyl group and other isomers, or has as its main component at least one substance expressed in formula (I) wherein R is a heptyl group selected from among the n-heptyl group and other isomers, or has as its main component at least one substance expressed in formula (I) wherein R is an octyl group selected from among the n-octyl group and other isomers, or has as its main component at least one substance expressed in formula (I) wherein R is a nonyl group selected from among the n-nonyl group and other isomers, or has as its main component at least one substance expressed in formula (I) wherein R is a decyl group selected from among the n-decyl group and other isomers.

The present invention also provides the image recording method described above, wherein the substance expressed in formula (I) above is one wherein n is 0 to 10, and m is 1 to 5.

The present invention also provides the image recording method described above, wherein the substance expressed in formula (I) above has an average molecular weight of 2,000 or less.

The present invention also provides the image recording method described above, wherein the substance expressed in formula (I) above is contained in an amount at 0.5 to 30 wt. %.

The present invention also provides a recording recorded by the image recording method described above.

DESCRIPTION OF THE PREFERRED EMBODIMENTS

Detailed descriptions are now given of the coating liquid, image recording method, and recordings of the present invention.

(Coating Liquid)

The coating liquid of the present invention comprises at least water, fine polymer particles, and a penetrating agent, particularly one or more penetrating agents selected from a group made up of acetylene glycol surfactants, acetylene alcohol surfactants, glycol ethers, and 1,2-alkylene glycols.

By fine polymer particles here is meant resins in general. That is, water soluble resins, and water insoluble resins dispersed in a fine particle form in water (generally expressed as emulsions, dispersions, latexes, or suspensions) in general.

For the fine polymer particles that can be used in the coating liquid of the present invention, it is possible to use anything so long as it will stably dissolve and/or disperse in water. The weight average molecular weight thereof should be within a range of 2,000 to 300,000 with 3,000 to 100,000 being a preferable range. If the weight average molecular weight is too low, image protection will cease to be adequate. If the weight average molecular weight is too high, the viscosity will be too high for coating with an ink jet recording procedure and it will be difficult to use.

Examples of such fine polymer particles include polyacrylic acids, styrene-acrylic acid compolymers, styrene-acrylic acid-acrylic acid alkyl ester copolymers, styrene-maleic acid copolymers, styrene-maleic acid-acrylic acid alkyl ester copolymers, styrene-methacrylic acid copolymers, styrene-methacrylic acid-acrylic acid alkyl ester copolymers, and styrene-maleic acid-half ester copolymers, together with salts thereof.

Also, the fine polymer particles contained in the coating liquid of the present invention may be used as an aqueous emulsion. This aqueous emulsion should be one the continuous phase whereof is water, and the dispersion phase whereof is an acrylic resin, methacrylic resin, styrene resin, urethane resin, acrylamide resin, epoxy resin, or mixture thereof. It is particularly desirable that the dispersion phase consist of acrylic acid and/or methacrylic acid. For the aqueous emulsion used in the coating liquid of the present invention, one consisting of the fine polymer particles noted earlier can be used, but it is particularly desirable that it exhibit film forming properties, with a minimum film formation temperature that is at or below room temperature (but minus 10° C. or greater) at the location where the printer is used, and preferably a temperature no less than 0° C. and no greater than 20° C. When the minimum film formation temperature is within this temperature range, there is no need to separately employ a special heating apparatus when forming the coating layer, thereby making it possible to make the image recording apparatus smaller and lighter in weight, with another benefit being that operation in not onerous during image formation.

By the fine polymer particles "exhibiting film formation properties" is here meant that the fine polymer particles have the capability of forming a coating film, when maintained at or above the minimum film formation temperature thereof, by the fine particles uniting and fusing together. Accordingly, when fine polymer particles having film forming properties are used, the fine polymer particles fuse and join together on the recording medium so that a coating film is formed. As a result, the rubbing resistance, water resistance, and glossiness of the recording can be greatly improved.

The fine polymer particles described in the foregoing is particularly well suited for use as an aqueous emulsion configured solely of a resin or resins having an acid value of 100 or less. When the acid value of the resin in the aqueous emulsion is 100 or lower, the resin will be substantially insoluble in water and, as a consequence, a coating layer formed solely therefrom will also be insoluble in water. Accordingly, in images whereon a coating layer is formed, even when a dye is used as the colorant, a benefit is gained in that recordings are obtained which exhibit good water resistance. Specific examples of such aqueous emulsions that can be cited include the Joncryl emulsions J-390, J-711, J-511, J-7001, J-632, J-741, J-450, J-840, J-47J, J-734, J-7600, J-775, J-537, J-352, J-790, J-780, and J-1535 (these being the names of products made by Johnson Polymer Co., Ltd.), Primal E-2212, Primal I-62, Primal I-94, Primal I-98, and Primal I-100 (products produced by Rohm and Haas Co.), etc., all of which are commercially available and usable as they are.

The amount of such fine polymer particles contained in the coating liquids of the present invention need only be such as both to enable images on recording mediums to be thoroughly coated when sprayed with an ink jet recording procedure and to cause no problems such as nozzle clogging when performing ink jet recording, with 1 to 40 wt. % in the coating liquid being a suitable amount, but preferably 2 to 20 wt. %, and more preferably 4 to 15 wt. %. When the fine polymer particles are used as an aqueous emulsion, the cited addition amounts correspond to the amounts of the solid resin part.

The surface tension of the coating liquids in the present invention should be 40 mN/m or less at 20° C. By making the surface tension 40 mN/m or lower, it is possible to form more uniform coating layers.

The coating liquids of the present invention should contain penetrating agents consisting of acetylene glycol or acetylene alcohol surfactants. By adding such penetrating agents as these, penetration into the recording medium is enhanced, and coating liquid fixation is also enhanced, which are benefits.

Citable examples of acetylene glycol surfactants include those wherein an average 30 or fewer ethylene oxy groups and/or propylene oxy groups are added to 2,4,7,9-tetramethyl-5-decine-4,7-diol, 3,6-dimetyl-4-octine-3,6-diol, or 2,4,7,9-tetramethyl-5-decine-4,7-diol, 3,6-dimethyl-4-octine-3,6-diol, and citable examples of acetylene alcohol surfactants include those wherein on average 30 or fewer ethylene oxy groups and/or propylene oxy groups are added to 2,4-dimethyl-5-hexine-3-ol, 3,5-dimethyl-1-hexane-3-ol, or, alternatively, 2,4-dimethyl-5-hexine 3 ol, 3,5-dimethyl-1-hexane-3-ol.

Particularly preferable among these are 2,4,7,9-tetramethyl-5-dicine-4,7,-diol, 3,6-dimethyl-4-octine-3,6-diol, and 3,5-dimethyl-1-hexane-3-ol.

It is also possible to use commercially available products for the acetylene glycol surfactant, specific examples whereof include Surfynol 82, 104, 240, 465, 485, and TG (all available from Air Products Co.), and a specific example of an acetylene alcohol surfactant is Surfynol 61 (also available from Air Products Co.).

The amount of the acetylene glycol surfactant and/or acetylene alcohol surfactant added to the coating liquid of the present invention should be 0.1 to 5.0 wt. % relative to the total volume of coating liquid, with a range of 0.5 to 2 wt. % being more favorable. When the amount added is within this range, the penetration-induced fixation of the coating liquid improves even further, and continuous high-speed coating is made easier.

The coating liquid of the present invention should also contain a penetrating agent selected from among glycol ethers and 1,2-alkylene glycols. By adding these penetrating agents, penetration into the recording medium is enhanced, and coating liquid fixation is also enhanced, which are benefits. These penetrating agents also act to enhance the film forming properties of the fine polymer particles described earlier, whereupon coating layers can be formed effectively on image surfaces.

The glycol ethers noted above should be one or a mixture of two or more substances selected from among a group comprising ethylene glycol mono(alkyl having 4 to 8 carbons) ether, triethylene glycol mono(alkyl having 4 to 8 carbons) ether, propylene glycol mono(alkyl having 3 to 6 carbons), and dipropylene glycol mono(alkyl having 3 to 6 carbons) ether.

Specific examples of glycol ethers, inclusive of glycol ethers other than those noted above, include ethylene glycol monomethyl ether, ethylene glycol monoethyl ether, ethylene glycol mono-n-butyl ether, ethylene glycol monomethyl ether acetate, diethylene glycol monomethyl ether, triethylene glycol monomethyl ether, diethylene glycol monoethyl ether, triethylene glycol monoethyl ether, diethylene glycol mono-n-propyl ether, ethylene glycol mono-iso-propyl ether, diethylene glycol mono-iso-propyl ether, triethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, and dipropylene glycol mono-n-butyl ether.

For the 1,2-alkylene glycols noted earlier, moreover, 1,2-(alkyl having 4 to 10 carbons) diols are preferable, specific examples whereof include, as specific examples of 1,2-alkylene glycols, 1,2-pentanediol, and 1,2-hexanediol, etc.

The coating liquid of the present invention should also contain 0.5 to 30 wt. % of the glycol ethers and/or 1,2-alkylene glycols noted earlier, and preferably contain 3 to 30 wt. % thereof. When that amount is less than 0.5 wt. %, the effect of enhancing penetration into the recording medium diminishes and the coating liquid becomes difficult to fix. When that amount exceeds 30 wt. %, the viscosity of the coating liquid rises and it becomes difficult to use the coating liquid in coating with an ink jet recording procedure. An even more favorable range is 5 to 10 wt. %.

According to a preferable aspect of the coating liquid of the present invention, in view of the fact that some of the acetylene glycol surfactants and/or glycol ethers noted in the foregoing exhibit low solubility in water, it is preferable that that solubility be improved by adding components such as the following. Examples of components that can be added include highly water-soluble glycol ethers, thiodiglycol, 1,4-butane diol, 1,2-pentanediol, 1,5-pentanediol, 1,2-hexane diol, 1,6-hexane diol, propylene glycol, dipropylene glycol, tripropylene glycol or other diols or glycols, as well as surfactants and the like.

The coating liquid of the present invention should contain therein at least one substance expressed in formula (I) below.

$$R\text{-}EOn\text{-}POm\text{-}X \qquad (I)$$

(where R is an alkyl group having 1 to 12 carbons, the structure whereof is a straight chain or branched structure, x is —H or $SO_3M$ (where M is a counter ion that is a hydrogen ion, alkaline metal ion, ammonium ion, or organic ammonium ion), EO is an ethylene oxy group, PO is a propylene oxy group, and n and m are repeating units, representing mean values in the system overall. EO and PO indicate presence in the molecule, with the order thereof being irrelevant.)

In the present invention, moreover, those substances in the "substances expressed in formula (I)" wherein R is the same (regardless of whether n, m, and X are the same or different) are treated as one type.

By adding substances having the structure expressed in formula (I), the ability of the coating liquid to penetrate into the recording medium is enhanced. As a consequence, coating layer fixation is also enhanced, making it easier to perform continuous coating at high speed.

It is preferable that the R expressed in formula (I) be an alkyl group having 4 to 10 carbons. If the number of carbons in R is 3 or fewer, the effect of enhancing penetration will decline.

More specifically, in the substances expressed in formula (I), R should be a group having the number of carbons C4 (butyl group), C5 (pentyl group), C6 (hexyl group), C7 (heptyl group), C8 (octyl group), C9 (nonyl group), or C10 (decyl group). When R is C3 (propyl group) or lower, the effect of enhancing penetrability declines.

According to a more preferable aspect, the number of carbons is 4 to 8, and even more preferably still, 4 to 6. The structure of R may be straight chain or a branched structure. However, when comparing substances having the same number of carbons, those having a branched structure will exhibit higher effectiveness in enhancing penetrability, and so are preferred.

In the coating liquid of the present invention, furthermore, the substance expressed in formula (I) above has as its main component at least one substance expressed in formula (I) wherein R is a butyl group selected from among the n-butyl, isobutyl, and t-butyl groups, or has as its main component at least one substance expressed in formula (I) wherein R is a pentyl group selected from among the n-pentyl group and other isomers, or has as its main component at least one substance expressed in formula (I) wherein R is a hexyl group selected from among the n-hexyl group and other isomers, or has as its main component at least one substance expressed in formula (I) wherein R is a heptyl group selected from among the n-heptyl group and other isomers, or has as its main component at least one substance expressed in formula (I) wherein R is an octyl group selected from among the n-octyl group and other isomers, or has as its main component at least one substance expressed in formula (I) wherein R is a nonyl group selected from among the n-nonyl group and other isomers, or has as its main component at least one substance expressed in formula (I) wherein R is a decyl group selected from among the n-decyl group and other isomers.

In the substances expressed in formula (I), when X is $-SO_3M$ (where M is a counter ion that is a hydrogen ion, alkaline metal ion, ammonium ion, or organic ammonium ion), the alkaline metal may be Li, Na, or K, and the organic ammonium may be alkyl ammonium, alkanol ammonium, for example, such, for example, as monomethyl ammonium, diethyl ammonium, tripropyl ammonium, monoethanol ammonium, diethanol ammonium, triethanol ammonium, monoisopropanol ammonium, tripropanol ammonium, N-isobutyl alcohol ammonium, N,N-dimethyl ethanol ammonium, N,N-diethyl ethanol ammonium, etc.

When X is hydrogen, if the molecular weight of R or PO is large compared to EO, the hydrophobic property of the substances expressed in formula (I) overall will increase, wherefore the solubility thereof in water will tend to decline. When X is $-SO_3M$, on the other hand, solubility in water is readily obtainable.

In tho coating liquid of the present invention, moreover, in the substances expressed in formula (I), n should be within a range of 0 to 10, and m within a range of 1 to 5.

The average molecular weight of the substance expressed in formula (I) should be 2,000 or less. When the average molecular weight exceeds 2,000, effectiveness in enhancing penetrability declines. It is preferable that the upper limit in this range be 1,000, and even more preferable that it be 500.

The amount of the substances expressed in formula (I) added to the coating liquid is discretionary, but a range of 0.5 to 30 wt. % relative to the total quantity of coating liquid is preferable, with 2 to 15 wt. % being more preferable, and 5 to 13 wt. % more preferable still. When the added amount is less than 0.5 wt. %, the effect of enhancing penetration is weakened, so the effect of enhancing coating liquid fixation declines. When the added amount exceeds 30 wt. %, the viscosity of the coating liquid rises, making coating with an ink jet recording procedure difficult.

In the coating liquid of the present invention, in terms of the components thereof, furthermore, such additives as UV absorbing agents, preservatives, antioxidants, electrical conductivity adjusting agents, pH adjusting agents, viscosity adjusting agents, surface tension adjusting agents, and oxygen absorbents can be appropriately used.

(Image Recording Method and Recordings)

The image recording method according to the present invention is a method wherewith the coating liquid of the present invention, described in the foregoing, is coated on with an ink jet recording procedure. That ink jet recording procedure may be performed by any commonly known method. For this reason, an apparatus for supplying the film coated becomes unnecessary, and there is no particular necessity either of an apparatus for effecting fixation, due to the properties of the coating liquids of the present invention. In order to further enhance fixation and/or image recording speed, however, an apparatus or the like for accelerating fixation or drying by heating or the like after coating may be used.

Another feature of the recording method of the present intention is that the images coated are effected using an ink jet recording procedure. Thereby, the ink jet recording apparatus for forming the images and the ink jet recording apparatus for spraying the coating liquid can be integrated into the same apparatus, and the equipment overall can be reduced in size, but it is also permissible to use two ink jet recording apparatuses, one for image recording and one for coating, connected in series.

With the image recording method of the present invention, moreover, a dye can be used for the colorant in the ink jet recording ink composition for recording images on recording mediums. For the dye used here, the water-soluble dyes used conventionally in ink jet recording ink compositions can be used. Examples of water-soluble dyes that can be used include disperse dye in addition to acid dye, basic dye, and direct dye.

With the recording method of the present invention, moreover, a pigment can be used for the colorant in the ink jet recording ink composition for recording on recording mediums. For the pigment used here, the pigments used conventionally in ink jet recording ink compositions can be used. Inorganic pigments such as titanium oxide, iron oxide, or carbon black, for example, can be used. Such organic pigments as azo pigments (for example, azo lake, insoluble azo pigment, or condensed azo pigment, etc.), polycyclic pigments (for example, phthalocyanine pigment, quinacridone pigment, or thioindigo pigment, etc.), nitro pigment, nitrose pigment, or aniline black can also be used.

Specific examples of inorganic pigments for use in black ink compositions that can be cited include such carbon blacks as furnace black, lampblack, acetylene black, and channel black (C. I. pigment black 7), and also iron oxide pigments and the like.

For organic pigments used in black ink compositions, such black organic pigments as aniline black (C. I. pigment black 1) or the like can be used.

Citable examples of pigments for use in yellow ink compositions include C. I. pigment yellow 1 (Hansa yellow G), 2, 3 (Hansa yellow 10G), 4, 5 (Hansa yellow 5G), 6, 7, 10, 11, 12, 13, 14, 16, 17, 24 (flavanthrone yellow), 34, 35, 37, 53, 55, 65, 73, 74, 75, 81, 83, 93, 94, 95, 97, 98, 99, 108 (anthrapyrimidine yellow), 109, 110, 113, 117 (copper complex salt pigment), 120, 124, 128, 129, 133, 130 (quinophthalone), 139 (isoindolinone), 147, 151, 153 (nickel complex pigment), 154, 167, 172, and 180, etc.

Citable examples of pigments for use in magenta ink compositions include C. I. pigment red 1 (parared), 2, 3 (toluidine red), 4, 5, (1 TR Red), 6, 7, 8, 9, 10, 11, 12, 14, 15, 16, 17, 18, 19, 21, 22, 23, 30, 31, 32, 37, 38 (pyrazolone red), 40, 41, 42, 88 (thioindigo), 112 (naphthol AS based), 114 (naphthol AS based), 122 (dimethyl quinacridone), 123, 144, 146, 149, 150, 166, 168 (anthroanthrone orange), 170 (naphthol AS based), 171, 175, 176, 177, 178, 179 (perylene maroon), 185, 187, 209 (dichloroquinacridone), 219, 224 (perylene based), 245 (naphthol AS based), or, alternatively, C. I. pigment violet 19 (quinacridone), 23 (dioxazine violet), 32, 33, 36, 38, 43, and 50, etc.

Citable examples of pigments for use in cyan ink compositions include C. I. pigment blue 15, 15:1, 15:2, 15:3, 16 (non-metallic phthalocyanine), 18 (alkali blue toner), 25, 60 (cerulean blue), 65 (violanthrone), and 66 (indigo), etc.

In addition, citable examples of organic pigments for use in color ink compositions other than magenta, cyan, or yellow ink compositions include: C. I. pigment green 7 (phthalocyanine green), 10 (green gold), 36, and 37; C. I. pigment brown 3, 5, 25, and 26; and C. I. pigment orange 1, 2, 5, 7, 13, 14, 15, 16, 24, 34, 36, 38, 40, 43, and 63, etc.

For the pigments noted above, those which are considered soluble and/or dispersable in water using a dispersant can be used. Dispersants can be generally categorized as anionic surfactant, nonionic surfactant, cationic surfactant, amphoteric surfactant, and high-molecular surfactant. Any of these may be selected as a dispersant for use in the ink compositions used in the image recording method of the present invention.

For the pigments noted in the foregoing, furthermore, it is preferable that they be "surface-treated pigments," that is, pigments which have been subjected to a physical or chemical surface treatment so that, by a functional group or salt thereof being grafted to the surface of the pigment particle, either directly or with an intervening polyvalent group, they are rendered dispersable and/or soluble in water without a dispersant.

The functional groups grafted to one pigment particle may be either one or a plurality of types. The type of functional group grafted, and the degree thereof, should be determined as appropriate, giving consideration to the dispersion stability in the ink, color density, and drying characteristics at the front surface of the ink jet head, etc.

Citable examples of functional groups include —OM, —COOM, —CO—, $SO_3M$, —$SO_2NH_2$, —$RSO_3M$, —$PO_3HM$, —$PO_3M_2$, —$SO_2NHCOR$, —$NH_3$, and —$NR_3$ (where M is a hydrogen atom, alkaline metal, ammonium or organic ammonium, R is an alkyl group, a phenyl group that may have a substituent, or a naphthyl group that may have a substituent, having 1 to 12 carbons), etc.

Citable examples of polyvalent groups include alkylene groups, phenylene groups that may have a substituent, and naphthylene groups that may have a substituent, having 1 to 12 carbons.

It is preferable that the pigments noted in the foregoing be surface-treated with a treatment agent containing sulfur so that $SO_3M$ and/or —$RSO_2M$ (where M is a counter ion that is a hydrogen ion, alkaline metal ion, ammonium ion, or organic ammonium ion) chemically bonds to the surface of the particles thereof. It is preferable, in other words, that those pigments be made capable of dispersing and/or dissolving in water by first dispersing the pigment in a solvent that has no active protons, that is not reactive with sulfonic acid, and wherein the pigment is insoluble or very slightly soluble, and then surface-treating the pigment with either amide-sulfuric acid or a complex of sulfur trioxide and a tertiary amine so that —$SO_3M$ and/or —$RSO_2M$ chemically bonds to the surface of the particles thereof.

Various commonly known surface treatment means can be employed as the surface treatment means for grafting the functional groups or salts thereof noted in the foregoing to the surface of the pigment, either directly or with an intervening polyvalent group.

Citable examples thereof include means wherewith commercially available oxide carbon black is treated with a solution of sodium hypochlorite or ozone and the carbon black is subjected to a further oxidization treatment to make the surface thereof more hydrophilic (described in Japanese Patent Application Laid-Open No. H7-250578/1995 (published), Japanese Patent Application Laid-Open No. H8-3498/1996 (published), Japanese Patent Application Laid-Open No. H10-120958/1998 (published), Japanese Patent Application Laid Open No. H10-195331/1998 (published), and Japanese Patent Application Laid-Open No. H10-237349/1998 (published), for example), means wherewith carbon black is treated with 3-amine-N-alkyl substituted pyridium bromide (described in Japanese Patent Application Laid-Open No. H10-195360/1998 (published) and Japanese Patent Application Laid-Open No. H10-330665/1998 (published), for example), means wherewith the organic pigment is dispersed in a solvent wherein that organic pigment is insoluble or slightly soluble and sulfone groups are inducted to the pigment particle surface using a sulfonating agent (described in Japanese Patent Application Laid-Open No. H8-283596/1996 (published), Japanese Patent Application Laid-Open No. H10 110110/1998 (published), and Japanese Patent Application Laid-Open No. H10-110111/1988 (published), for example), and means wherewith the organic pigment is dispersed in an alkaline solvent that forms a complex with sulfur trioxide, the surface of the organic pigment is treated by adding sulfur trioxide thereto, and sulfone groups or sulfonamine groups are inducted thereto (described in Japanese Patent Application Laid-Open No. H10-110114/1998 (published), for example). However, the fabrication means for the surface-treated pigments used in the present invention are not limited to or by these means.

The absolute value of the zeta potential of the surface-treated pigment dispersion liquid (aqueous dispersion liquid) used in the ink compositions of the present invention at 20° C. and pH 8 to 9 should be 30 mV or higher. That is, because these surface-treated pigments secure dispersion stability by electrical repulsion induced by dispersed groups inducted to the surface of the particles thereof, it is preferable that the potential (zeta potential) at the pigment surface be at or above a certain value. In cases where the penetrating agents described subsequently and the surface-treated pigments described in the foregoing and deemed desirable in the ink compositions of the present invention are added to the ink composition, the absolute value of the zeta potential of the surface-treated pigment dispersion liquid at 20° C. and pH 8 to 9 should be 30 mV or higher in order to secure pigment dispersion stability.

The zeta potential of the surface-treated pigment dispersion liquid at 20° C. and pH 8 to 9 is measured with a laser Doppler electrophoresis apparatus (ELS-800 produced by Otsuka Electronic).

Surface-treated pigment dispersion liquids exhibiting zeta potential absolute values of 30 mV or higher at 20° C. and pH 8 to 9 are obtained by such means as are described subsequently in example, for example.

The amount of pigment added as colorant, although discretionary, should be 0.5 to 20 wt. % relative to the total quantity of ink composition, with a range of 2 to 10 wt. % being preferable. At 0.5 wt. % and above, images having the desired image density are readily obtained, and, at 20 wt. % and below, the ink viscosity can be easily adjusted to facilitate stable discharge in ink jet procedures.

In the ink compositions used in the image recording method of the present invention, it is preferable that one or more substances selected from a group comprising acetylene glycol surfactants, acetylene alcohol surfactants, glycol ethers, and 1,2-alkylene glycols be used as the penetrating agent described earlier.

It is preferable that the acetylene glycol surfactants and acetylene alcohol surfactants used be the same as or similar to those used preferably in the coating liquid described earlier. The amount of each acetylene glycol surfactant and/or acetylene alcohol surfactant added should be 0.1 to 3 wt. % relative to the total quantity of ink composition, with a range of 0.5 to 2 wt. % being preferable. When that amount is less than 0.1 wt. %, it is difficult to obtain an adequate penetration effect, and when 3 wt. % is exceeded, the nozzle surfaces on the ink jet head are wetted, and in some cases it is difficult to obtain stable discharge.

It is preferable that the glycol ethers and 1,2-alkylene glycols used be the same as or similar to those used preferably in the coating liquid described earlier. The amount of such glycol ethers and/or 1,2 alkylene glycols added should constitute a content of 0.5 to 30 wt. % relative to the entire quantity of ink composition, with a content ranging from 3 to 30 wt. % being preferable. When that amount is less than 0.5 wt. %, an adequate penetration effect is difficult to obtain. When 30 wt. % is exceeded, the viscosity of the ink composition rises, and in some cases it is difficult to obtain stable discharge.

The ink composition used in the image recording method of the present invention should also contain at least one substance having the structure expressed in formula (I) below in the ink composition.

R-EOn-POm-X (I)

(where R represents an alkyl group having 1 to 12 carbons, the structure whereof may be either a straight chain or branching; X represents —H or —$SO_2M$ (where M is a counter ion that is a hydrogen ion, alkaline metal ion, ammonium ion, or organic ammonium ion); EO represents an ethylene oxy group; PO represents a propylene oxy group; and n and m are repeating units, indicating average values in the system overall. EO and PO indicate presence in the molecule, with the order thereof being irrelevant.)

By adding substances having the structure expressed by the formula (I) above, the ink composition penetrability into the recording medium is enhanced. As to specific examples of substances such as these, substances the same as or similar to those used preferably in the coating liquid described earlier should be used.

The amount of the substances exhibited by formula (I) above added into the ink composition is discretionary, but should be 0.5 to 30 wt. % relative to the entire quantity of ink composition. When the added amount is less than 0.5 wt. %, the affect of enhancing penetrability is weakened, whereas when the added amount exceeds 30 wt. %, the viscosity of the ink composition rises and in some cases it is difficult to obtain stable discharge.

The surface tension of the ink composition used in the image recording method of the present invention should be 40 mN/m or less at 20° C.

As components in the ink composition used in the image recording method of the present invention, furthermore, such additives as UV absorbing agents, preservatives, antioxidants, electrical conductivity adjusting agents, pH adjusting agents, viscosity adjusting agents, surface tension adjusting agents, and oxygen absorbents can be appropriately used.

In the image recording method of the present invention, moreover, the film thickness of the dried coating layer need only be such that the recorded images can be thoroughly coated, with 0.1 to 100 μm being reasonable, and a range of 0.5 to 20 μm being preferable. When the colorant in the image recording ink composition is a dye, a range of 2 to 20 μm is to be preferred. When the colorant in the image recording ink composition is one made dispersable and/or soluble in water by a dispersant, a film thickness range of 0.5 to 5 μm is to be preferred. And when the colorant in the image recording ink composition is a surface-treated pigment, a film thickness range of 0.5 to 10 μm is to be preferred.

Paper is generally used for the recording medium used in the image recording method of the present invention, but a resin such as plastic or a metal or the like may also be used if the surface thereof has been treated and it has an ink absorption layer.

Recordings recorded using the image recording method of the present invention exhibit good recording fastness properties such as light resistance, water resistance, and fixation, and good image quality having outstanding glossiness is obtained, making them effective for use in outdoor posters and signs.

When a surface-treated pigment is used as the colorant in the image recording ink composition, in particular, in addition to the qualities noted above, the composition is fast-drying, making it possible to perform recording with high image density and high picture quality, and rubbing resistance can also be improved. Thus such image recording ink compositions are particularly effective for use in outdoor posters and signs.

EXAMPLES

The present invention is described in further detail in the following examples, but the present invention is not limited thereto or thereby. The physical property values given in these examples and comparative examples are values at 20° C., with the mean particle diameters measured with the particular size distribution meter ELS-800 (produced by Otsuka Electronic Co.), the viscosities measured with the rotating viscosity meter RFS2 (produced by Rheometric Co.) using a shearing speed of 200/second, and the surface tensions measured by the surface tension meter CBVP-A3 (produced by Kyowa Surfactant Chemical Co.). Parts and percentages are all by weight unless otherwise indicated.

Example 1

| | |
|---|---|
| Direct black #154 | 5.0% |
| Ethylene glycol monoethyl ether | 12.0% |
| Ethylene glycol monomethyl ether | 8.0% |
| Triethylene glycol mono-iso-propyl ether | 8.0% |
| Glycerin | 5.0% |
| Nonoethanolamine | 0.8% |
| Potassium hydroxide | 0.1% |
| Ion exchange water | Remainder |

The components noted above were thoroughly mixed and stirred in a vessel, and filtrated using a membrane filter having a pore size of 10 μm, whereupon an image recording ink composition (having a surface tension of 34 mN/m) was fabricated.

(2) Coating Liquid Preparation

A styrene-acrylic acid copolymer system emulsion (product name: Joncryl 679, produced by Johnson Polymer Co.) was used as the aqueous emulsion for the fine polymer particles in example 1. The average molecular weight of the copolymer in the Joncryl 679 was 7,000 and the acid value was 200. The lowest film formation temperature of this fine polymer particle emulsion was 90° C.

| | |
|---|---|
| Joncryl 679 | 35.0% (as solid material) |
| Diethylene glycol mono-n-hexyl ether | 5.0% |
| 1,5-pentandiol | 3.0% |
| Substance (1) expressed in formula (I) | 0.4% |
| Glycerin | 5.0% |
| Diethanolamine | 2.5% |
| Ion exchange water | Remainder |

In the substance (1) expressed in formula (I), furthermore, R is a neopentyl group, X is hydrogen, n is 3.0, and m is 1.5.

The components noted above were thoroughly mixed and stirred in a vessel, and filtrated using a membrane filter having a pore size of 10 μm, whereupon a coating liquid (having a surface tension of 35 mN/m) was fabricated.

(3) Recording Fabrication

Recording medium: Photo Paper (produced by Seiko-Epson Corporation)

Printer: PM-700C (produced by Seiko-Epson Corporation)

The image recording ink composition of example 1(1) and the coating liquid of example 1(2) were loaded, respectively, into the PM-700C and the recording 1 of example 1 was obtained by two recording head scans, namely a scan to form the image, and a scan to spray on the coating liquid.

The image density in recording 1 was at a level presenting no problem in practice, and the drying speed was sufficiently fast.

Example 2

(1) Pigment Dispersion Liquid Fabrication

After completely dissolving 4 parts styrene-acrylic acid copolymer resin (average molecular weight=20,000; acid value=200), 2.5 parts triethanolamine, 0.5 part isopropyl alcohol, 5 parts of a polyoxyethyleneoleyl ether system dispersant (product name: Hytenol 18E, produced by Dai-ichi Kogyo Seiyaku), and 68 parts ion exchange water under heating to 70° C., 20 parts carbon black MA7 (produced by Mitsubishi Chemical Corporation) were mixed in and stirred, and dispersion was effected with an Eiger Motor Mill (produced by Eiger Japan) until the mean particle diameter of the pigment was 100 nm (with a bead packing ratio of 70% and media diameter of 0.7 mm).

(2) Image Recording Ink Composition Preparation

| | |
|---|---|
| Example 2(1) pigment dispersion liquid | 35.0% |
| Surfynol 420 | 0.5% |
| Triethylene glycol mono-iso-propyl ether | 3.0% |
| 1,6-hexanediol | 2.0% |
| Glycerin | 5.0% |
| Triethanolamine | 0.9% |
| Ion exchange water | Remainder |

The components noted above were thoroughly mixed and stirred in a vessel, and filtrated using a membrane filter having a pore size of 10 μm, to prepare an image recording ink composition (having a surface tension of 32 mN/m).

(3) Coating Liquid Preparation

A styrene-acrylic acid copolymer system emulsion (product name: Joncryl 68, produced by Johnson Polymer Co.) was used as the emulsion for the fine polymer particles in example 2. The average molecular weight of the copolymer in the Joncryl 68 was 10,000 and the acid value was 195.

The lowest film formation temperature of this fine polymer particle emulsion was 70° C.

| | |
|---|---|
| Joncryl 68 | 20.0% (as solid material) |
| Surfynol 485 | 1.2% |
| Propylene glycol monoethyl ether | 5.0% |
| Substance (2) expressed in formula (I) | 0.3% |
| Tetraethylene glycol | 3.5% |
| Diethylene glycol | 7.0% |
| Triethanolamine | 2.0% |
| Ion exchange water | Remainder |

In the substance (2) expressed in formula (I), moreover, R is a 1,3-demethylbutyl group, X is —$SO_3M$ where M is a sodium ion, n is 3.0, and m is 1.3.

The components noted above were thoroughly mixed and stirred in a vessel, and filtrated using a membrane filter having a pore size of 10 μm, to prepare a coating liquid (having a surface tension of 30 mN/m).

(4) Recording Preparation

Recording medium: Photo Paper (produced by Seiko-Epson Corporation)

Printer: PM-700C (produced by Seiko-Epson Corporation)

The image recording ink composition of example 2(2) and the coating liquid of example 2(3) were loaded, respectively, into the PM-700C and the recording 2 of example 2 was obtained by two recording head scans, namely a scan to form the image, and a scan to spray on the coating liquid.

The image density in recording 2 was at a level presenting no problem in practice, and the drying speed was sufficiently fast.

Example 3

(1) Image Recording Ink Composition Preparation

| | |
|---|---|
| Example 2(1) pigment dispersion liquid | 25.0% |
| Direct black #154 | 3.0% |
| Surfynol 104E | 0.5% |
| Dipropylene glycol monomethyl ether | 5.0% |
| 1,5-pentanediol | 3.0% |
| Glycerin | 8.0% |
| Diethylene glycol | 3.0% |
| Triethanolamine | 0.9% |
| Ion exchange water | Remainder |

The components noted above were thoroughly mixed and stirred in a vessel, and filtrated using a membrane filter having a pore size of 10 μm, to prepare an image recording ink composition (having a surface tension of 32 mN/m).

(2) Coating Liquid Preparation

In example 3, an acrylic based emulsion (product name: Primal AC-490, produced by Rohm and Haas Co.) was used for the fine polymer particles. The minimum film formation temperature of this fine polymer particle emulsion was 18° C.

| | |
|---|---|
| Primal AC-490 | 2.0% (solid part) |
| Surfynol 440 | 0.8% |
| Diethylene glycol mono-n-propyl ether | 7.0% |
| 1,6-hexanediol | 0.5% |
| Glycerin | 8.0% |
| Ion exchange water | Remainder |

The components noted above were thoroughly mixed and stirred in a vessel, and filtrated using a membrane filter having a pore size of 10 μm, to prepare a coating liquid (having a surface tension of 31 mN/m).

(3) Recording Preparation

Recording medium: Photo Paper (produced by Seiko-Epson Corporation)

Printer: PM-700C (produced by Seiko-Epson Corporation)

The image recording ink composition of example 3(1) and the coating liquid of example 3(2) were loaded, respectively, into the PM-700C and the recording 3 of example 3 was obtained by two recording head scans, namely a scan to form the image, and a scan to spray on the coating liquid.

The image density in recording 3 was at a level presenting no problem in practice, and the drying speed was sufficiently fast.

Example 4

(1) Surface-treated Pigment Preparation

Into 280 parts sulfolane were mixed 22 parts carbon black MA-100 (produced by Mitsubishi Chemical Corporation), and this was graded and dispersed for 1 hour with an Eiger Motor Mill (produced by Eiger Japan) with a bead packing ratio of 70% and a turning speed of 5,000 rpm. The mixture liquid of the graded and dispersed pigment paste and solvent was transferred to an evaporator and heated at 120° C. under a reduced pressure of 30 mm Hg to evaporate off as much of the moisture contained in the system as possible, after which temperature control was effected to 150° C. Next, 26 parts sulfur trioxide were added and caused to react for 7 hours. After that reaction was complete, several washings were performed with excessive sulfolane, then the material was poured into water and filtrated to yield surface-treated carbon black pigment particles.

(2) Pigment Dispersion Liquid Preparation

To 20 parts of the surface-treated carbon black obtained in example 4(1) were added 2.5 parts triethanolamine as a neutralizing agent, and 77.5 parts ion exchange water. Using a paint shaker (bead packing ratio=60%; media diameter=1.7 mm), dispersion was effected until the mean particle diameter (secondary particle diameter) of the carbon black became 100 nm to yield a surface-treated carbon black pigment dispersion liquid. The absolute value of the zeta potential of the surface-treated carbon black pigment dispersion liquid at 20° C. and pH 8 to 9 was 62 mV.

(3) Image Recording Ink Composition Preparation

| | |
|---|---|
| Example 4(2) pigment dispersion liquid | 30.0% |
| Surfynol 485 | 0.5% |
| Surfynol TG | 0.5% |
| Triethylene glycol mono-n-butyl ether | 5.0% |
| Propylene glycol mono-n-butyl ether | 2.0% |

-continued

| | |
|---|---|
| 1,2-hexanediol | 3.0% |
| Substance (3) expressed in formula (I) | 5.0% |
| Glycerin | 15.0% |
| Triethanolamine | 0.3% |
| Ion exchange water | Remainder |

In substance (3) represented by formula (I), R is an n-hexyl group, X is hydrogen, n is 5.0, and m is 1.0.

The components noted above were thoroughly mixed and stirred in a vessel, and filtrated using a membrane filter having a pore size of 10 μm, to prepare an image recording ink composition (having a surface tension of 29 mN/m).

(4) Emulsion Preparation

Into a reaction vessel equipped with a drip apparatus, thermometer, water-cooled reflex condenser, and stirrer, 72.7 parts ion exchange water were placed. While stirring this at 75° C. in a nitrogen atmosphere, 0.2 part potassium persulfate (polymerization starter) was added. A monomer solution wherein 0.05 part sodium lauryl sulfate, 4 parts glycidoxy acrylate, 5 parts styrene, 6 parts tetrahydrofurfuryl acrylate, 5 parts butylmethacrylate, and 0.05 parts t-dodecyl mercaptan were put into 7 parts ion exchange water was dripped into the reaction vessel prepared as noted above, at 75°, causing a reaction to produce a primary substance. Next, 2 parts of a 10% solution of ammonium persulfate were added and stirred into the primary substance in the reaction vessel, and, last of all, 30 parts ion exchange water, 0.2 part potassium lauryl sulfate, 30 parts styrene, 25 parts butyl methacrylate, 6 parts butyl acrylate, 2 parts acrylic acid, 1 part 1,6-hexanediol dimethacrylate, and 0.5 part t-dodecyl mercaptan were further added to the reaction vessel while stirring at 70° C. After causing a polymerization reaction, the pH was adjusted to 8.5 by neutralizing with sodium hydroxide, whereupon an aqueous emulsion of fine polymer particles was prepared and made emulsion A. The minimum film formation temperature of this fine polymer particle emulsion was 20° C.

(5) Coating Liquid Preparation

| | |
|---|---|
| Example 4(4) emulsion A | 11.0% (as solid part) |
| Diethylene glycol mono-t-butyl ether | 7.0% |
| 1,2-pentanediol | 1.5% |
| Substance (4) expressed in formula (I) | 5.0% |
| Thiodiglycol | 2.0% |
| Glycerin | 15.0% |
| Monoethanolamine | 0.6% |
| Ion exchange water | Remainder |

In the substance (4) expressed in formula (I), R is a 1,1-dimethylbutyl group, X is hydrogen, n is 4.0, and m is 1.0.

The components noted above were thoroughly mixed and stirred in a vessel, and filtrated using a membrane filter having a pore size of 10 μm, to prepare a coating liquid (having a surface tension of 33 mN/m).

(6) Recording Preparation

Recording medium: Photo Paper (produced by Seiko-Epson Corporation)

Printer: PM-700C (produced by Seiko-Epson Corporation)

The image recording ink composition of example 4(3) and the coating liquid of example 4(5) were loaded, respectively, into the PM-700C and the recording 4 of example 4 was obtained by two recording head scans, namely a scan to form the image, and a scan to spray on the coating liquid.

The image density in recording 4 was very high, and visibility was outstanding. The drying speed was also very fast.

Example 5

(1) Image Recording Ink Composition Preparation

| | |
|---|---|
| Example 2(1) pigment dispersion liquid | 20.0% |
| Example 4(2) pigment dispersion liquid | 20.0% |
| Direct black #154 | 3.0% |
| Surfynol 465 | 0.0% |
| Triethylene glycol mono-t-butyl ether | 5.0% |
| Glycerin | 10.0% |
| Triethanolamine | 0.6% |
| Ion exchange water | Remainder |

The components noted above were thoroughly mixed and stirred in a vessel, and filtrated using a membrane filter having a pore size of 10 μm, to prepare an image recording ink composition (having a surface tension of 30 mN/m).

(2) Coating Liquid Preparation

In example 5, an acrylic acid-styrene copolymer system emulsion (product name: Joncryl Emulsion J-775, produced by Johnson Polymer Co.) was used for the fine polymer particle aqueous emulsion. The minimum film formation temperature of this emulsion was 15° C., and the acid value was 55.

| | |
|---|---|
| Joncryl Emulsion J-775 | 3.0% (as solid part) |
| Surfynol TG | 0.8% |
| Dipropylene glycol mono-t-butyl ether | 2.0% |
| Substance (5) expressed in formula (I) | 7.0% |
| 2-pyrrolidone | 5.0% |
| Glycerin | 13.0% |
| Triethanolamine | 0.9% |
| Ion exchange water | Remainder |

The substance (5) expressed in formula (I) is a mixture of 50% of a substance wherein R is an n-hexyl group and 50% of a substance wherein R is a 2-ethlyhexyl group, with X being —$SO_3M$ in both, where M is a lithium ion. In the substance wherein R is an n-hexyl group, n is 4.0 and m is 2.0, whereas in the substance wherein R is a 2-ethylhexyl group, n is 4.0 and m is 0.

The components noted above were thoroughly mixed and stirred in a vessel, and filtrated using a membrane filter having a pore size of 10 μm, to prepare a coating liquid (having a surface tension of 29 mN/m).

(3) Recording Preparation

Recording medium: Photo Paper (produced by Seiko-Epson Corporation)

Printer: PM-700C (produced by Seiko-Epson Corporation)

The image recording ink composition of example 5(1) and the coating liquid of example 5(2) were loaded, respectively, onto the PM-700C and the recording 5 of example 5 was obtained by two recording head scans, namely a scan to form the image, and a scan to spray on the coating liquid.

The image density in recording 5 was very high, and visibility was outstanding. The drying speed was also very fast.

Example 6

(1) Surface-treated Pigment Preparation 17 parts phthalocyanine pigment (C. I. pigment blue 15:3) were mixed with 450 parts quinoline, and this was graded and dispersed for 2 hours with an Eiger Motor Mill M (produced by Eiger Japan) with a bead packing ratio of 70% and a turning speed of 5,000 rpm. The mixture liquid of the graded and dispersed pigment paste and solvent was transferred to an evaporator and heated at 120° C. under a reduced pressure of 30 mm Hg to evaporate off as much of the moisture contained in the system as possible, after which temperature control was effected to 160° C. Next, 22 parts of a sulfonated pyridine complex were added and caused to react for 8 hours. After that reaction was complete, several washings were performed with excessive quinoline, then the material was poured into water and filtrated to yield surface-treated phthalocyanine pigment particles.

(2) Pigment Dispersion Liquid Preparation

To 10 parts of the surface-treated phthalocyanine pigment obtained in example 6(1) were added 2 parts N,N-diethylethanolamine as a neutralizing agent, and 88 parts ion exchange water. Using a paint shaker (bead packing ratio=60%; media diameter=1.7 mm), dispersion was effected until the mean particle diameter (secondary particle diameter) of the phthalocyanine became 95 nm to yield a surface-treated phthalocyanine pigment dispersion liquid. The absolute value of the zeta potential of the surface-treated phthalocyanine pigment dispersion liquid at 20° C. and pH 8 to 9 was 53 mV.

(3) Image Recording Ink Composition Preparation

| | |
|---|---|
| Example 6(2) pigment dispersion liquid | 50.0% |
| Surfynol 465 | 0.6% |
| Propylene glycol mono-t-butyl ether | 4.0% |
| 1,2-pentanediol | 3.0% |
| Glycerin | 15.0% |
| Triisopropanolamine | 0.2% |
| Ion exchange water | Remainder |

The components noted above were thoroughly mixed and stirred in a vessel, and filtrated using a membrane filter having a pore size of 10 μm, to prepare an image recording ink composition (having a surface tension of 30 mN/m).

(4) Coating Liquid Preparation

For the fine polymer particle aqueous emulsion in example 6, a styrene-acrylic acid copolymer system emulsion (product name: Joncryl Emulsion J-741, produced by Johnson Polymer Co.) was used. The average molecular weight of the copolymer in Joncryl Emulsion J-741 is 3,900. The minimum film formation temperature of this fine polymer particle emulsion is 5° C., and the acid value is 51.

| | |
|---|---|
| Joncryl Emulsion J-741 | 5.0% (as solid part) |
| Surfynol 82 | 0.5% |
| Propylene glycol mono-iso-propyl ether | 3.0% |
| 1,2-hexanediol | 10.0% |
| Substance (6) expressed in formula (I) | 5.0% |
| Glycerin | 9.0% |
| Triethanolamine | 0.9% |
| Ion exchange water | Remainder |

In substance (6) expressed in formula (I), R is an isobutyl group, X is —$SO_3M$, where M is a potassium ion, n is 3.0, and m is 3.0.

The components noted above were thoroughly mixed and stirred in a vessel, and filtrated using a membrane filter having a pore size of 10 μm, to prepare a coating liquid (having a surface tension of 31 mN/m).

(5) Recording Preparation

Recording medium: Photo Paper (produced by Seiko-Epson Corporation)

Printer: PM-700C (produced by Seiko-Epson Corporation)

The image recording ink composition of example 6(3) and the coating liquid of example 6(4) were loaded, respectively, into the PM-700C and the recording 6 of example 6 was obtained by two recording head scans, namely a scan to form the image, and a scan to spray on the coating liquid.

The image density in recording 6 was very high, and visibility was outstanding. The drying speed was also very fast.

Example 7

(1) Surface-treated Pigment Preparation 24 parts dimethyl quinacridon pigment (C. I. pigment red 122) were mixed with 520 parts quinoline, and this was graded and dispersed for 2 hours with an Eiger Motor Mill (produced by Eiger Japan) with a bead packing ratio of 70% and a turning speed of 5,000 rpm. The mixture liquid of the graded and dispersed pigment paste and solvent was transferred to an evaporator and heated at 120° C. under a reduced pressure of 30 mm Hg to evaporate off as much of the moisture contained in the system as possible, after which temperature control was effected to 165° C. Next, 22 parts of a sulfonated pyridine complex were added as a reaction agent and this material was caused to react for 4 hours. After that reaction was complete, several washings were performed with excessive quinoline, then the material was poured into water and filtrated to yield surface-treated dimethyl quinacridon pigment particles.

(2) Pigment Dispersion Liquid Preparation

To 15 parts of the surface-treated dimethyl quinacridon pigment obtained in example 7(1) were added 2 parts tripropanolamine as a neutralizing agent, and 83 parts ion exchange water. Using a paint shaker (bead packing ratio—60%; media diameter=1.7 mm), dispersion was effected until the mean particle diameter (secondary particle diameter) of the dimethyl quinacridon became 100 nm to yield a surface-treated dimethyl quinacridon pigment dispersion liquid. The absolute value of the zeta potential of the surface-treated dimethyl quinacridon pigment dispersion liquid at 20° C. and pH 8 to 9 was 45 mV.

(3) Image Recording Ink Composition Preparation

| | |
|---|---|
| Example 7(2) pigment dispersion liquid | 50.0% |
| Surfynol TG | 0.1% |
| Triethylene glycol mono-n-butyl ether | 0.5% |
| 1,2-pentanediol | 15.0% |
| 1,2-hoxanodiol | 10.0% |
| Glycerin | 5.0% |
| Triethylene glycol | 3.0% |
| Triisopropanolamine | 0.3% |
| Ion exchange water | Remainder |

The components noted above were thoroughly mixed and stirred in a vessel, and filtrated using a membrane filter having a pore size of 10 μm, to prepare an image recording ink composition (having a surface tension of 30 mN/m).

(4) Emulsion Preparation

Into a reaction vessel equipped with a drip apparatus, thermometer, water-cooled reflex condenser, and stirrer, 62.7 parts ion exchange water were placed. While stirring this at 70° C. in a nitrogen atmosphere, 0.2 part potassium persulfate (polymerization starter) was added. A monomer solution wherein 0.06 part sodium lauryl sulfate, 10 parts styrene, 5 parts glycidoxymethacrylate, 15 parts butylmethacrylate, and 0.04 parts t-dodecyl mercaptan were put into 7 parts ion exchange water was dripped into the reaction vessel prepared as noted above, at 70°, and caused to react to produce a primary substance. Next, 2 parts of a 10% solution of ammonium persulfate were added and stirred into the primary substance in the reaction vessel, and, last of all, 30 parts ion exchange water, 0.2 part potassium lauryl sulfate, 30 parts styrene, 20 parts butyl acrylate, 10 parts acrylic acid, 1 part acrylamide, and 0.5 part t-dodecyl mercaptan were further added to the reaction vessel while stirring at 70° C. After causing a polymerization reaction, the pH was made 8.5 by neutralizing with triethanolamine, whereupon an aqueous emulsion of fine polymer particles was prepared and made emulsion B. The minimum film formation temperature of this fine polymer particle emulsion was −5° C.

(5) Coating Liquid Preparation

| | |
|---|---|
| Example 7(4) emulsion | 13.0% (as solid part) |
| Surfynol 485 | 1.0% |
| Dipropylene glycol mono-n-butyl ether | 2.0% |
| Substance (7) expressed in formula (I) | 10.0% |
| Glycerin | 5.0% |
| Trimethylol propane | 1.0% |
| Triethanolamine | 0.7% |
| Ion exchange water | Remainder |

The substance (7) expressed in formula (I) is a mixture of 50% of a substance wherein R is a 1,3-dimethylbutyl group and 50% of a substance wherein R is an n-heptyl group, with X being hydrogen in both. In the substance wherein R is a 1,3-dimethylbutyl group, n is 3.0 and m is 1.0, whereas in the substance wherein R is an n-heptyl group, n is 3.5 and m is 1.0.

The components noted above were thoroughly mixed and stirred in a vessel, and filtrated using a membrane filter having a pore size of 10 μm, to prepare a coating liquid (having a surface tension of 28 mN/m).

(5) Recording Preparation

Recording medium: Photo Paper (produced by Seiko-Epson Corporation)

Printer: PM-700C (produced by Seiko-Epson Corporation

The image recording ink composition of example 7(3) and the coating liquid of example 7(4) were loaded, respectively, into the PM-700C and the recording 7 of example 7 was obtained by two recording head scans, namely a scan to form the image, and a scan to spray on the coating liquid.

The image density in recording 7 was very high, and visibility was outstanding. The drying speed was also very fast.

Example 8

(1) Surface-treated Pigment Preparation 22 parts isoindolinone pigment (C. I. pigment yellow 109) were mixed with 510 parts quinoline, and this was graded and dispersed for 2 hours with an Eiger Motor Mill M250

(produced by Eiger Japan) with a bead packing ratio of 70% and a turning speed of 5,000 rpm. The mixture liquid of the graded and dispersed pigment paste and solvent was transferred to an evaporator and heated at 120° C. under a reduced pressure of 30 mm Hg to evaporate off as much of the moisture contained in the system as possible, after which temperature control was effected to 160° C. Next, 21 parts of a sulfonated pyridine complex were added as a reaction agent and this material was caused to react for 4 hours. After that reaction was complete, several washings were performed with excessive quinoline, then the material was poured into water and filtrated to yield surface-treated isoindolinone pigment particles.

(2) Pigment Dispersion Liquid Preparation

To 20 parts of the surface-treated isoindolinone pigment obtained in example 8(1) were added 5 parts (10 wt. %) of an aqueous solution of sodium hydroxide as a neutralizing agent, and 75 parts ion exchange water. Using a paint shaker (bead packing ratio=60%; media diameter=1.7 mm), dispersion was effected until the mean particle diameter (secondary particle diameter) of the isoindolinone became 90 nm to yield a surface-treated isoindolinone pigment dispersion liquid. The absolute value of the zeta potential of the surface-treated isoindolinone pigment dispersion liquid at 20° C. and pH 8 to 9 was 50 mV.

(3) Image Recording Ink Composition Preparation

| | |
|---|---|
| Example 8(2) pigment dispersion liquid | 50.0% |
| Surfynol 465 | 1.2% |
| Triethylene glycol mono-t-butyl ether | 5.0% |
| Substance (8) expressed in Formula (I) | 2.0% |
| Glycerin | 10.0% |
| Tetraethylene glycol | 4.0% |
| Triethanolamine | 0.3% |
| Ion exchange water | Remainder |

In substance (8) expressed in formula (I), R is a L-butyl group, X is —$SO_3M$ where M is an ammonium ion, n is 3.0, and m is 1.0.

The components noted above were thoroughly mixed and stirred in a vessel, and filtrated using a membrane filter having a pore size of 10 μm, to prepare an image recording ink composition (having a surface tension of 29 mN/m).

(4) Coating Liquid Fabrication

In example 8, an acrylic emulsion (product name: Primal AC-61, produced by Rohm and Haas) was used as the fine polymer particle aqueous emulsion. The minimum film formation temperature of this fine polymer particle emulsion was 18° C.

| | |
|---|---|
| Primal AC-61 | 15.0 (as solid part) |
| Surfynol 485 | 1.0% |
| Propylene glycol mono-n-butyl ether | 5.0% |
| Substance (9) expressed in formula (I) | 2.0% |
| Tetrapropylene glycol | 5.0% |
| Diethylene glycol | 5.0% |
| Glycerin | 5.0% |
| Triisopropanolamine | 0.3% |
| Ion exchange water | Remainder |

The substance (9) expressed in formula (I) is a mixture of 50% of a substance wherein R is a neopentyl group, 30% of a substance wherein R an n-pentyl group, and 20% of a substance wherein R is an isopentyl group, in all whereof X is —$SO_3M$, where M is a triethanolamine cation. In the substance wherein R is a neopentyl group, n is 1.0 and m is 0.3. In the substance wherein R is n-pentyl, n is 2.5 and m is 1.0. And in the substance where R is an isopentyl group, n is 3.0 and m is 1.5.

The components noted above were thoroughly mixed and stirred in a vessel, and filtrated using a membrane filter having a pore size of 10 μm, to prepare a coating liquid (having a surface tension of 30 mN/m).

(5) Recording Preparation

Recording medium: Photo Paper (produced by Seiko-Epson Corporation)

Printer: PM-700C (produced by Seiko-Epson Corporation)

The image recording ink composition of example 8(3) and the coating liquid of example 8(4) were loaded, respectively, into the PM-700C and the recording 8 of example 8 was obtained by two recording head scans, namely a scan to form the image, and a scan to spray on the coating liquid.

The image density in recording 8 was very high, and visibility was outstanding. The drying speed was also very fast.

Example 9

(1) Surface-treated Pigment Preparation 220 g of carbon black ("MA-100" produced by Mitsubishi Chemical Corporation) were mixed and dispersed in 1,000 g of water. Into this was dripped 400 g of sodium hypochlorite (12%). This was stirred for 10 hours at 90 to 110° C., then water washing and filtration were done repeatedly to yield surface-treated carbon black pigment particles.

(2) Pigment Dispersion Liquid Preparation

To 15 parts of the surface-treated carbon black pigment obtained in example 9(1) were added 10 parts (10 wt. %) of an aqueous solution of sodium hydroxide as a neutralizing agent, and 75 parts ion exchange water. Using a paint shaker (head packing ratio=60%; media diameter=1.7 mm), dispersion was effected until the mean particle diameter (secondary particle diameter) of the carbon black became 110 nm to yield a surface-treated carbon black pigment dispersion liquid having 15 wt. % of carboxyl group and phenolic hydroxyl group in the surface thereof. The absolute value of the zeta potential of the surface-treated carbon black pigment dispersion liquid at 20° C. and pH 8 to 9 was 55 mV.

(3) Image Recording Ink Composition Preparation

| | |
|---|---|
| Example 9(2) pigment dispersion liquid | 30.0% |
| Surfynol TG | 0.1% |
| Substance (10) expressed in formula (I) | 21.0% |
| Glycerin | 5.0% |
| Triethylene glycol | 3.0% |
| Ion exchange water | Remainder |

In substance (10) expressed in formula (I), R is a t-butyl group, x is —$SO_3M$ where M is a sodium ion, n is 3.0, and m is 1.0.

The components noted above were mixed and then filtrated to yield an image recording ink composition (surface tension=28 mN/m).

(4) Coating Liquid Preparation

In example 9, an acrylic emulsion (product name: Primal AC-507, produced by Rohm and Haas) was used as the fine polymer particle aqueous emulsion. The minimum film formation temperature of this fine polymer particle emulsion was 14° C.

| | |
|---|---|
| Primal AC-507 | 4.0% (as solid part) |
| Surfynol 485 | 1.0% |
| Propyline glycol mono-t-butyl ether | 4.0% |
| 1,2-hexane diol | 0.5% |
| Substance (11) expressed in formula (I) | 1.0% |
| Glycerin | 5.0% |
| Propylene glycol | 3.0% |
| Triethanolamine | 0.3% |
| Ion exchange water | Remainder |

In the substance (11) expressed in formula (I), R is an n-octyle group, X is hydrogen, n is 5.0, and m is 1.0.

The components noted above were thoroughly mixed and stirred in a vessel, and filtrated using a membrane filter having a pore size of 10 μm, to prepare a coating liquid (having a surface tension of 31 mN/m).

(5) Recording Preparation

Recording medium: Photo Paper (produced by Seiko-Epson Corporation)

Printer: PM-700C (produced by Seiko-Epson Corporation)

The image recording ink composition of example 9(3) and the coating liquid of example 9(4) were loaded, respectively, into the PM-700C and the recording 9 of example 9 was obtained by two recording head scans, namely a scan to form the image, and a scan to spray on the coating liquid.

The image density in recording 9 was quite high, and visibility was outstanding. The drying speed was also very fast.

Example 10

(1) Surface-treated Pigment Preparation 25 g of carbon black ("MA-77" produced by Mitsubishi Chemical Corporation) were mixed and dispersed in 500 g of water. The liquid obtained was subjected to a treatment for 2.5 hours, while stirring, with a gas containing ozone at an ozone concentration of 8 wt. %, at a flow rate of 500 cc/minute. Water washing and filtration were then done repeatedly to yield surface-treated carbon black pigment particles.

(2) Pigment Dispersion Liquid Preparation

To 16 parts of the surface-treated carbon black pigment obtained in example 10(1) were added 8 parts (10 wt. %) of an aqueous solution of sodium hydroxide as a neutralizing agent, and 76 parts ion exchange water. Using a paint shaker (bead packing ratio—60%; media diameter=1.7 mm), dispersion was effected until the mean particle diameter (secondary particle diameter) of the carbon black became 115 nm to yield a 16 wt. % surface-treated carbon black pigment dispersion liquid.

The absolute value of the zeta potential of the surface-treated carbon black pigment dispersion liquid at 20° C. and pH 8 to 9 was 40 mV.

(3) Image Recording Ink Composition Preparation

| | |
|---|---|
| Example 10(2) pigment dispersion liquid | 40.0% (as solid part) |
| Surfynol 465 | 1.0% |
| Ethylene glycol mono-t-butyl ether | 8.0% |

-continued

| | |
|---|---|
| 1,2-hexanediol | 2.0% |
| Triethylene glycol | 5.0% |
| Glycerin | 10.0% |
| Ion exchange water | Remainder |

The components noted above were mixed and then filtrated to yield an image recording ink composition (surface tension=32 mN/m).

(4) Coating Liquid Preparation

In example 10, an acrylic emulsion (product name: Primal AC-22, produced by Rohm and Haas) was used as the fine polymer particle aqueous emulsion. The minimum film formation temperature of this fine polymer particle emulsion was 8° C.

| | |
|---|---|
| Primal AC-22 | 8.0% (as solid part) |
| Surfynol 485 | 1.0% |
| Propyline glycol mono-n-butyl ether | 2.0% |
| Substance (12) expressed in formula (I) | 2.0% |
| Propylene glycol | 5.0% |
| Diethylene glycol | 5.0% |
| Glycerin | 5.0% |
| Triethanolamino | 0.3% |
| Ion exchange water | Remainder |

In the substance (12) expressed in formula (I), R is an n-hexyl group, X is hydrogen, n is 4.0, and m is 3.0.

The components noted above were thoroughly mixed and stirred in a vessel, and filtrated using a membrane filter having a pore size of 10 μm, to prepare a coating liquid (having a surface tension of 30 mN/m).

(5) Recording Preparation

Recording medium: Photo Paper (produced by Seiko Epson Corporation)

Printer: PM-700C (produced by Seiko-Epson Corporation)

The image recording ink composition of example 10(3) and the coating liquid of example 10(4) were loaded, respectively, into the PM-700C and the recording 10 of example 10 was obtained by two recording head scans, namely a scan to form the image, and a scan to spray on the coating liquid.

The image density in recording 10 was quite high, and visibility was outstanding. The drying speed was also very fast.

Example 11

(1) Surface-treated Pigment Preparation 15 g of carbon black ("MA-100" produced by Mitsubishi Chemical Corporation) and 5 g of p-amino-N-benzoic acid were mixed and dispersed in 110 g of water. Into this were dripped 2.4 g of nitric acid, and stirring was done for 5 minutes at 70° C. An aqueous solution of sodium nitrite was added and, after stirring for another 2 hours, water washing and filtration were done repeatedly to yield surface-treated carbon black pigment particles.

(2) Pigment Dispersion Liquid Preparation

To 12 parts of the surface-treated carbon black pigment obtained in example 11(1) were added 8 parts (10 wt. %) of an aqueous solution of sodium hydroxide as a neutralizing agent, and 80 parts ion exchange water. Using a paint shaker (using glass beads; bead packing ratio=60%; media diameter=1.7 mm), dispersion was effected until the mean particle diameter (secondary particle diameter) of the carbon black became 110 nm to yield a 12 wt. % surface-treated carbon black pigment dispersion liquid with a sulfone group bonded through a phenyl group to the surface thereof. The absolute value of the zeta potential of the surface-treated carbon black pigment dispersion liquid at 20° C. and pH 8 to 9 was 35 mV.

(3) Image Recording Ink Composition Preparation

| | |
|---|---|
| Example 11(2) pigment dispersion liquid | 50.0% |
| Surfynol 440 | 0.5% |
| Diethylene glycol mono-n-butyl ether | 2.0% |
| 1,2-pentanediol | 2.0% |
| Substance (13) expressed in formula (I) | 2.0% |
| Glycerin | 9.0% |
| Diethylene glycol | 4.0% |
| 2-pyrrolidone | 5.0% |
| Ion exchange water | Remainder |

In the substance (13) expressed in formula (I), R is an n-pentyl group, X is hydrogen, n is 3.0, and m is 1.0. The components noted above were mixed and then filtrated to yield an image recording ink composition (surface tension: 31 mN/m).

(4) Coating Liquid Preparation

In example 11, an acrylic colloidal dispersion (product name: Primal I-100, produced by Rohm and Haas) was used as the fine polymer particle aqueous emulsion. The minimum film formation temperature of this fine polymer particle colloidal dispersion was 18° C.

| | |
|---|---|
| Primal I-100 | 10.0% (as solid part) |
| Surfynol 465 | 1.0% |
| Diethylens glycol mono-t-butyl ether | 1.0% |
| 1,5-pentanediol | 2.0% |
| Substance (14) expressed in formula (I) | 1.0% |
| Tetraethylene glycol | 5.0% |
| Diethylene glycol | 5.0% |
| Glycerin | 5.0% |
| Triethanolamine | 0.3% |
| Ion exchange water | Remainder |

In substance (14) expressed in formula (I), furthermore, R is a t-butyl group, X is hydrogen, n is 3.0, and m is 2.0.

The components noted above were thoroughly mixed and stirred in a vessel, and filtrated using a membrane filter having a pore size of 10 μm, to prepare a coating liquid (having a surface tension of 30 mN/m).

(5) Recording Preparation

Recording medium: Photo Paper (produced by Seiko-Epson Corporation)

Printer; PM-700C (produced by Seiko-Epson Corporation)

The image recording ink composition of example 11(3) and the coating liquid of example 11(4) were loaded, respectively, into the PM-700C and the recording 11 of example 11 was obtained by two recording head scans, namely a scan to form the image, and a scan to spray on the coating liquid.

The image density in recording 11 was quite high, and visibility was outstanding. The drying speed was also very fast.

Example 12

(1) Surface-treated Pigment Preparation

Keeping a solution wherein anthranilic acid was added to a concentrated aqueous solution of hydrochloric acid continually at 10° C. or lower, an aqueous solution of sodium nitrite wherein 2 g of sodium nitrite were added to 10 g of water at 5° C. was added, and, while stirring for 20 minutes, 25 g of carbon black ("MA-100" produced by Mitsubishi Chemical Corporation) were mixed in and dispersed. Stirring was done for an additional 30 minutes. Then water washing and filtration were done repeatedly to yield surface-treated carbon black pigment particles.

(2) Pigment Dispersion Liquid Preparation

To 10 parts of the surface-treated carbon black pigment obtained in example 12(1) were added 2 parts of triethanolamine and 88 parts ion exchange water. Using a paint shaker (bead packing ratio=60%; media diameter=1.7 mm), dispersion was effected until the mean particle diameter (secondary particle diameter) of the carbon black became 108 nm to yield a 10 wt. % surface-treated carbon black pigment dispersion liquid with a carboxyl group bonded through a phenyl group to the surface thereof. The absolute value of the zeta potential of the surface-treated carbon black pigment dispersion liquid at 20° C. and pH 8 to 9 was 3 mV.

(3) Image Recording Ink Composition Preparation

| | |
|---|---|
| Example 12(2) pigment dispersion liquid | 50.0% |
| Propylene glycol mono-n-butyl ether | 3.0% |
| 1,2-hexane diol | 2.0% |
| Glycerin | 10.0% |
| Triethylene glycol | 8.0% |
| Ion exchange water | Remainder |

The components noted above were mixed and then filtrated to yield an image recording ink composition.

(4) Coating Liquid Preparation

In example 12, a styrene-acrylic acid copolymer system emulsion (product name; Joncryl Emulsion J-537, produced by Johnson Polymer) wan used as the fine polymer particle aqueous emulsion. The minimum film formation temperature of this fine polymer particle emulsion was 42° C. and the acid value was 40.

| | |
|---|---|
| Joncryl Emulsion J-537 | 1.0% (as solid part) |
| Surfynol 485 | 1.0% |
| Ethylene glycol mono-n-butyl ether | 5.0% |
| 1,2-pentanediol | 2.0% |
| 1,2-hexanediol | 2.0% |
| Tetrapropylene glycol | 2.0% |
| Tetraethylene glycol | 8.0% |
| Glycerin | 5.0% |
| Triethanolamine | 0.3% |
| Ion exchange water | Remainder |

The components noted above were thoroughly mixed and stirred in a vessel, and filtrated using a membrane filter having a pore size of 10 μm, to prepare a coating liquid (having a surface tension of 32 mN/m).

(4) Recording Preparation

Recording medium: Photo Paper (produced by Seiko Epson Corporation)

Printer: PM-700C (produced by Seiko-Epson Corporation)

The image recording ink composition of example B12(2) and the coating liquid of example B12(3) were loaded, respectively, into the PM-700C and the recording 12 of example B12 was obtained by two recording head scans, namely a scan to form the image, and a scan to spray on the coating liquid.

The image density in recording 12 was quite high, and visibility was outstanding. The drying speed was also very fast.

Example 13

(1) Surface Treated Pigment Preparation 20 g of carbon black ("MA-100" produced by Mitsubishi Chemical Corporation) and 62 g of p-amino-N-ethylpyridinium bromide were mixed and dispersed in 150 g of water. Into this were dripped 32 g of nitric acid, and stirring was done for 5 minutes at 75° C. An aqueous solution of sodium nitrite was added and, after stirring for another 2 hours, water washing and filtration were done repeatedly to yield surface-treated carbon black pigment particles.

(2) Pigment Dispersion Liquid Preparation

To 10 parts of the surface-treated carbon black pigment obtained in example 13(1) were added 2 parts triethanolamine and 88 parts ion exchange water. Using a paint shaker (bead packing ratio=60%; media diameter=1.7 mm), dispersion was effected until the mean particle diameter (secondary particle diameter) of the carbon black became 108 nm to yield a 10 wt. % surface-treated carbon black pigment dispersion liquid with an N-ethylpyridyl group bonded to the surface thereof. The absolute value of the zeta potential of the surface-treated carbon black pigment dispersion liquid at 20° C. and pH 8 to 9 was 41 mV.

(3) Image Recording Ink Composition Preparation

| | |
|---|---|
| Example 13(2) pigment dispersion liquid | 65.0% |
| Surfynol 485 | 1.8% |
| Surfynol 440 | 0.8% |
| 1,2-pentanediol | 0.5% |
| Glycerin | 15.0% |
| Ion exchange water | Remainder |

The components noted above were mixed and then filtrated to yield an image recording ink composition (surface tension=33 mN/m).

(4) Coating Liquid Preparation

In example 13, styrene-acrylic acid copolymer system emulsions (product names: Joncryl Emulsion J-741 and Joncryl Emulsion J-775, produced by Johnson Polymer) were used for the fine polymer particle aqueous emulsion. The minimum film formation temperatures of these fine polymer particle emulsions were 5° C. for J-741 and 15° C. for J-775, and the acid value were 51 for J-741 and 55 for J-775.

| | |
|---|---|
| Joncryl Emulsion J-741 | 20.0% (as solid part) |
| Joncryl Emulsion J-775 | 18.0% (as solid part) |
| Triethylene glycol mono-n-butyl ether | 5.0% |
| Triethylene glycol | 8.0% |
| Surfynol 485 | 1.0% |
| 1,5-pentanediol | 2.5% |
| Glycerin | 5.0% |

-continued

| | |
|---|---|
| Triethanolamine | 0.3% |
| Ion exchange water | Remainder |

The components noted above were thoroughly mixed and stirred in a vessel, and filtrated using a membrane filter having a pore size of 10 μm, to prepare a coating liquid (having a surface tension of 31 mN/m).

(4) Recording Preparation

Recording medium: Photo Paper (produced by Seiko-Epson Corporation)

Printer: PM-700C (produced by Seiko-Epson Corporation)

The image recording ink composition of example 13(2) and the coating liquid of example 13(3) were loaded, respectively, into the PM-700C and the recording 13 of example 13 was obtained by two recording head scans, namely a scan to form the image, and a scan to spray on the coating liquid.

The image density in recording 13 was quite high, and visibility was outstanding. The drying speed was also very fast.

Example 14

(1) Image Recording Ink Composition Preparation

| | |
|---|---|
| Direct black #154 | 5.0% |
| Glycerin | 5.0% |
| Diethylene glycol mono-n-butyl ether | 5.0% |
| Surfynol TG | 1.0% |
| 2-pyrrolidone | 5.0% |
| Triethanolamine | 0.8% |
| Potassium hydroxide | 0.1% |
| Ion exchange water | Remainder |

The components noted above were thoroughly mixed and stirred in a vessel, and filtrated using a membrane filter having a pore size of 0.5 μm, to prepare an image recording ink composition (having a surface tension of 33 mN/m).

(2) Coating Liquid Preparation

In example 14, a styrene-acrylic acid copolymer system emulsion (product name: Joncryl Emulsion J-390, produced by Johnson Polymer) was used as the fine polymer particle aqueous emulsion. The acid value is J-390 is 54, and the minimum film formation temperature is 5° C. or lower.

| | |
|---|---|
| Joncryl Emulsion J-390 | 12.0% (as solid part) |
| Diethylene glycol mono-n-butyl ether | 5.0% |
| 1,5-pentanediol | 8.0% |
| Formula (J) substance (1) | 8.0% |
| Glycerin | 5.0% |
| Triethanolamine | 0.3% |
| Ion exchange water | Remainder |

In substance (1) in formula (I), R is a neopentyl group, X is hydrogen, n is 3.0, and m is 1.5.

The components noted above were thoroughly mixed and stirred in a vessel, and filtrated using a membrane filter having a pore size of 10 μm, to prepare a coating liquid (having a surface tension of 35 mN/m).

(3) Recording Preparation

Recording medium: Photo Paper (produced by Seiko Epson Corporation)

Printer: PM-700C (produced by Seiko-Epson Corporation)

The image recording ink composition of example 14(1) and the coating liquid of example 14(2) were loaded, respectively, into the PM-700C and the recording 14 of example 14 was obtained by two recording head scans, namely a scan to form the image, and a scan to spray on the coating liquid.

The image density in recording 14 was at a level presenting no problem in practice, and the drying speed after image recording was sufficiently fast.

Example 15

(1) Pigment Dispersion Liquid Preparation

After completely dissolving 4 parts styrene-acrylic acid copolymer resin (average molecular weight=20,000; acid value=200), 2.5 parts triethanolamine, 0.5 part isopropyl alcohol, 5 parts of a polyoxyethyleneoleyl ether system dispersant (product name: Hytenol 18E, produced by Daiichi Kogyo Seiyaku), and 68 parts ion exchange water under heating to 70° C., 20 parts carbon black MA7 (Produced by Mitsubishi Chemical Corporation) were mixed in and stirred, and dispersion was effected with an Eiger Motor Mill (produced by Eiger Japan) until the mean particle diameter of the pigment was 100 nm (with a bead packing ratio of 70% and media diameter of 0.7 mm).

(2) Image Recording Ink Composition Preparation

| | |
|---|---|
| Example 15(1) pigment dispersion liquid | 35.0% |
| Glycerin | 5.0% |
| Triethylene glycol mono-n-butyl ether | 4.0% |
| 1,5-pentanediol | 2.0% |
| Surfynol 465 | 1.0% |
| Triethanolamine | 0.9% |
| Ion exchange water | Remainder |

The components noted above were thoroughly mixed and stirred in a vessel, and filtrated using a membrane filter having a pore size of 10 μm, to prepare an image recording ink composition (having a surface tension of 35 mN/m).

(3) Coating Liquid Preparation

In example 15, a styrene-acrylic acid copolymer emulsion (product name: Joncryl Emulsion J-711, produced by Johnson Polymer) was used as the fine polymer particle aqueous emulsion. J 711 has an acid value of 100, with a minimum film formation temperature of 5° C. or lower.

| | |
|---|---|
| Joncryl Emulsion J-711 | 10.0% (as solid part) |
| Dipropylene glycol mono-n-butyl ether | 5.0% |
| Tetraethylene glycol | 3.5% |
| Diethylene glycol | 7.0% |
| Surfynol 465 | 1.2% |
| Formula (I) substance (2) | 10.0% |
| Triethanolamine | 0.9% |
| Ion exchange water | Remainder |

In substance (2) in formula (I), R is a 1,3-dimethylbutyl group, X is —$SO_3M$ where M is a sodium ion, n is 3.0, and m is 1.3.

The components noted above were thoroughly mixed and stirred in a vessel, and filtrated using a membrane filter having a pore size of 10 μm, to prepare a coating liquid (having a surface tension of 32 mN/m).

(4) Recording Fabrication

Recording medium: Photo Paper (produced by Seiko-Epson Corporation)

Printer: PM-700C (produced by Seiko-Epson Corporation)

The image recording ink composition of example 15(2) and the coating liquid of example 15(3) were loaded, respectively, into the PM-700C and the recording 15 of example 15 was obtained by two recording head scans, namely a scan to form the image, and a scan to spray on the coating liquid.

The image density in recording 15 was at a level presenting no problem in practice, and the drying speed after image recording was sufficiently fast.

Example 16

(1) Image Recording Ink Composition Preparation

| | |
|---|---|
| Example 15(1) pigment dispersion liquid | 25.0% |
| Direct black #154 | 3.0% |
| Glycerin | 8.0% |
| Diethylene glycol | 3.0% |
| Diethylene glycol mono-n-butyl ether | 3.0% |
| Surfynol 465 | 1.0% |
| Triethanolamine | 0.9% |
| Ion exchange water | Remainder |

The components noted above were thoroughly mixed and stirred in a vessel, and filtrated using a membrane filter having a pore size of 10 μm, to prepare an image recording ink composition (having a surface tension of 38 mN/m).

(2) Coating Liquid Preparation

In example 16, an acrylic acid-methacrylic acid copolymer emulsion (product name: Joncryl Emulsion J-511, produced by Johnson Polymer) was used as the fine polymer particle aqueous emulsion. J-511 has an acid value of 54, with a minimum film formation temperature of 5° C. or lower.

| | |
|---|---|
| Joncryl Emulsion J-511 | 13.0% (as solid part) |
| Triethylene glycol mon-n-butyl ether | 7.0% |
| 1,6 hexanediol | 5.0% |
| Surfynol 465 | 1.0% |
| Ion exchange water | Remainder |

The components noted above were thoroughly mixed and stirred in a vessel, and filtrated using a membrane filter having a pore size of 10 μm, to prepare a coating liquid (having a surface tension of 31 mN/m).

(3) Recording Preparation

Recording medium: Photo Paper (produced by Seiko-Epson Corporation)

Printer: PM-700C (produced by Seiko-Epson Corporation)

The image recording ink composition 3 of example 16(1) and the coating liquid 3 of example A3(2) was loaded, respectively, into the PM-700C and the recording 16 of example 16 was obtained by two recording head scans, namely a scan to form the image, and a scan to spray on the coating liquid.

The image density in recording 16 was at a level presenting no problem in practice, and the drying speed after image recording was sufficiently fast.

Example 17

(1) Surface-treated pigment preparation

Into 250 parts sulfolane were mixed 20 parts carbon black MA-100 (produced by Mitsubishi Chemical Corporation), and this was graded and dispersed for 1 hour with an Eiger Motor Mill (produced by Eiger Japan) with a bead packing ratio of 70% and a turning speed of 5,000 rpm. The mixture liquid of the graded and dispersed pigment paste and solvent was transferred to an evaporator and heated at 120° C. under a reduced pressure of 30 mm Hg to evaporate off as much of the moisture contained in the system as possible, after which temperature control was effected to 150° C. Next, 25 parts sulfur trioxide were added and caused to react for 6 hours. After that reaction was complete, several washings were performed with excessive sulfolane, then the material was poured into water and filtrated to yield surface-treated carbon black pigment particles.

(2) Pigment Dispersion Liquid Preparation

To 20 parts of the surface-treated carbon black obtained in example 17(1) were added 2.5 parts monoethanolamine as a neutralizing agent, and 77.5 parts ion exchange water. Using a paint shaker (using glass beads; bead packing ratio=60%; media diameter=1.7 mm), dispersion was effected until the mean particle diameter (secondary particle diameter) of the carbon black became 100 nm to yield a surface-treated carbon black pigment dispersion liquid. The absolute value of the zeta potential of the surface-treated carbon black pigment dispersion liquid so obtained at 20° C. and pH 8 to 9 was 60 mV.

(3) Image Recording Ink Composition Preparation

| | |
|---|---|
| Example 17(2) pigment dispersion liquid | 30.0% |
| Glycerin | 15.0% |
| Diethylene glycol mono-n-butyl ether | 10.0% |
| Surfynol 465 | 0.6% |
| Substance (3) expressed in formula (I) | 0.5% |
| Triethanolamine | 0.3% |
| Ion exchange water | Remainder |

In the substance (3) expressed in formula (I), moreover, R is an n-hexyl group, X is hydrogen, n is 5.0, and m is 1.0.

The components noted above were thoroughly mixed and stirred in a vessel, and filtrated using a membrane filter having a pore size of 10 μm, to prepare an image recording ink composition (having a surface tension of 30 mN/m).

(4) Coating Liquid Preparation

In example 17, a styrene-acrylic acid copolymer emulsion (product name: Joncryl Emulsion J-7001, produced by Johnson Polymer) was used as the fine polymer particle aqueous emulsion. J-7001 has an acid value of 87, with a minimum film formation temperature of 5° C. or lower.

| | |
|---|---|
| Joncryl Emulsion J-7001 | 11.0% (as solid part) |
| Diethylene glycol mono-t-butyl ether | 7.0% |
| Thiodiglycol | 2.0% |
| 1,5-pentanediol | 0.5% |
| Substance (4) in formula (I) | 5.0% |
| Glycerin | 15.0% |
| Triethanolamine | 0.6% |
| Ion exchange water | Remainder |

In substance (4) in formula (I), R is a 1,1-dimethylbutyl group, x is hydrogen, n is 4.0, and m is 1.0.

The components noted above were thoroughly mixed and stirred in a vessel, and filtrated using a membrane filter having a pore size of 10 μm, to prepare a coating liquid (having a surface tension of 34 mN/m).

(5) Recording Preparation

Recording medium: Photo Paper (produced by Seiko-Epson Corporation)

Printer: PM-700C (produced by Seiko-Epson Corporation)

The image recording ink composition of example 17(3) and the coating liquid of example 17(4) were loaded, respectively, into the PM-700C and the recording 17 of example 17 was obtained by two recording head scans, namely a scan to form the image, and a scan to spray on the coating liquid.

The image density in recording 17 was very high, and visibility was outstanding. The drying speed after image recording was also sufficiently fast.

Example 18

(1) Preparation of Image Recording Ink Composition

| | |
|---|---|
| Pigment dispersion liquid of Example 15(1) | 20.0% |
| Pigment dispersion liquid of Example 17(2) | 20.0% |
| Direct black #154 | 3.0% |
| Glycerin | 10.0% |
| Triethylene gylycol mono-n-butyl ether | 5.0% |
| Surfynol 465 | 0.8% |
| Triethanolamine | 0.6% |
| Ion exchange water | Remainder |

The components noted above were thoroughly mixed and stirred in a vessel, and filtrated using a membrane filter having a pore size of 10 μm, to prepare an image recording ink composition (having a surface tension of 30 mN/m).

(2) Coating Liquid Preparation

In example 18, an acrylic acid-styrene copolymer emulsion (product name: Joncryl Emulsion J-450, produced by Johnson Polymer) was used as the fine polymer particle aqueous emulsion. J-450 has an acid value of 100, with a minimum film formation temperature of 5° C. or lower.

| | |
|---|---|
| Joncryl Emulsion J-450 | 2.01 (as solid part) |
| Diethylene glycol mono-n-butyl ether | 2.0% |
| Surfynol TG | 0.8% |
| Formula (I) substance (5) | 7.0% |
| Glycerin | 13.0% |
| Triethanolamine | 0.9% |
| Ion exchange water | Remainder |

The substance (5) in formula (I) is a mixture of 50% of a substance wherein R is an n-hexyl group and 50% of a substance wherein R is a 2-ethylhexyl group, X is —$SO_3M$ in both, where M is a lithium ion, n is 4.0 and m is 2.0 in the n-hexyl group substance, and n is 4.0 and m is 0 in the 2 ethylhexyl group substance.

The components noted above were thoroughly mixed and stirred in a vessel, and filtrated using a membrane filter having a pore size of 10 μm, to prepare a coating liquid (having a surface tension of 28 mN/m).

(3) Recording Preparation

Recording medium: Photo Paper (produced by Seiko-Epson Corporation)

Printer: PM-700C (produced by Seiko-Epson Corporation)

The image recording ink composition of example 18(1) and the coating liquid of example 18(2) were loaded, respectively, into the PM-700C and the recording 18 of example 18 was obtained by two recording head scans, namely a scan to form the image, and a scan to spray on the coating liquid.

The image density in recording 18 was quite high, and visibility was outstanding. The drying speed after image recording was also very fast.

Example 19

(1) Surface-treated Pigment Preparation 15 parts phthalocyanine pigment (C. I. pigment blue 15:3) were mixed with 450 parts quinoline, and this was graded and dispersed for 2 hours with an Eiger Motor Mill M (produced by Eiger Japan) with a bead packing ratio of 70% and a turning speed of 5,000 rpm. The mixture liquid of the graded and dispersed pigment paste and solvent was transferred to an evaporator and heated at 120° C. under a reduced pressure of 30 mm Hg to evaporate off as much of the moisture contained in the system as possible, after which temperature control was effected to 160° C. Next, 20 parts of a sulfonated pyridine complex were added and caused to react for 8 hours. After that reaction was complete, several washings were performed with excessive quinoline, then the material was poured into water and filtrated to yield surface-treated phthalocyanine pigment particles.

(2) Pigment Dispersion Liquid Preparation

To 10 parts of the surface-treated phthalocyanine pigment obtained in example 19(1) were added 2 parts diethanolamine as a neutralizing agent, and 88 parts ion exchange water. Using a paint shaker (using glass beads; bead packing ratio=60%; media diameter=1.7 mm), dispersion was effected until the mean particle diameter (secondary particle diameter) of the phthalocyanine became 95 nm to yield a surface-treated phthalocyanine pigment dispersion liquid. The absolute value of the zeta potential of the surface-treated phthalocyanine pigment dispersion liquid obtained, at 20° C. and pH 8 to 9, was 54 mV.

(3) Image Recording Ink Composition Preparation

| | |
|---|---|
| Example 19(2) pigment dispersion liquid | 50.0% |
| Propylene glycol mono-n-propyl ether | 2.0% |
| Surfynol TG | 0.6% |
| Glycerin | 15.0% |
| 1,2-pentanediol | 5.0% |
| Propanolamine | 0.2% |
| Ion exchange water | Remainder |

The components noted above were thoroughly mixed and stirred in a vessel, and filtrated using a membrane filter having a pore size of 10 μm, to prepare an image recording ink composition (having a surface tension of 31 mN/m).

(4) Coating Liquid Preparation

In example 19, an acrylic acid copolymer emulsion (product name: Primal I-62, produced by Rohm and Haas Co.) was used for the fine polymer particle aqueous emulsion. Primal I-62 has an acid value of 100 and minimum film formation temperature of 26° C.

| | |
|---|---|
| Primal I-62 | 5.0% (as solid part) |
| Triethylene glycol mono-n-butyl ether | 5.0% |
| Diethylene glycol | 3.0% |
| 1,5-pentanediol | 3.0% |
| Surfyno1 465 | 0.5% |
| Substance (6) in Formula (I) | 8.0% |
| Triethanolamine | 0.9% |
| Ion exchange water | Remainder |

In substance (6) in formula (I), R is an isobutyl group, X is —$SO_3M$ where M is a potassium ion, n is 3.0, and m is 0.5.

The components noted above were thoroughly mixed and stirred in a vessel, and filtrated using a membrane filter having a pore size of 10 μm, to prepare a coating liquid (having a surface tension of 33 mN/m).

(5) Recording Preparation

Recording medium: Photo Paper (produced by Seiko-Epson Corporation)

Printer: PM-700C (produced by Seiko-Epson Corporation)

The image recording ink composition of example 19(3) and the coating liquid of example 19(4) were loaded, respectively, into the PM-700C and the recording 19 of example 19 was obtained by two recording head scans, namely a scan to form the image, and a scan to spray on the coating liquid.

The image density in recording 19 was very high, and visibility was outstanding. The drying speed after image recording was also very fast.

Example 20

(1) Surface-treated Pigment Preparation 20 parts dimethyl quinacridon pigment (C. I. pigment red 122) were mixed with 500 parts quinoline, and this was graded and dispersed for 2 hours with an Eiger Motor Mill (produced by Riger Japan) with a bead packing ratio of 70% and a turning speed of 5,000 rpm. The mixture liquid of the graded and dispersed pigment paste and solvent was transferred to an evaporator and heated at 120° C. under a reduced pressure of 30 mm Hg to evaporate off as much of the moisture contained in the system as possible, after which temperature control was effected to 160° C. Next, 20 parts of a sulfonated pyridine complex were added as a reaction agent and this material was caused to react for 4 hours. After that reaction was complete, several washings were performed with excessive quinoline, then the material was poured into water and filtrated to yield surface-treated dimethyl quinacridon pigment particles.

(2) Pigment Dispersion Liquid Preparation

To 15 parts of the surface-treated dimethyl quinacridon pigment obtained in example 20(1) were added 1 part propanolamine as a neutralizing agent, and 84 parts ion exchange water. Using a paint shaker (using glass beads; bead packing ratio=60%; media diameter=1.7 mm), dispersion was effected until the mean particle diameter (secondary particle diameter) of the dimethyl quinacridon became 100 nm to yield a surface-treated dimethyl quinacridon pigment dispersion liquid. The absolute value of the zeta potential of the surface-treated dimethyl quinacridon pigment dispersion liquid obtained, at 20° C. and pH 8 to 9, was 40 mV.

(3) Image Recording Ink Composition Preparation

| | |
|---|---|
| Pigment dispersion liquid of Example 20(2) | 50.0% |
| Glycerin | 15.0% |
| Diethylene glycol mono-t-butyl ether | 5.0% |
| Triethylene glycol mono-iso-propyl ether | 4.0% |
| Surfynol TG | 0.6% |
| Triethanolamine | 0.3% |
| Ion exchange water | Remainder |

The components noted above were thoroughly mixed and stirred in a vessel, and filtrated using a membrane filter having a pore size of 10 μm, to prepare an image recording ink composition (having a surface tension of 29 mN/m).

(4) Coating Liquid Preparation

In example 20, a styrene-acrylic acid copolymer emulsion (product name: Joncryl Emulsion J-1535, produced by Johnson Polymer) was used for the fine polymer particle aqueous emulsion. Primal J-1535 has an acid value of 98 and minimum film formation temperature of 15° C.

| | |
|---|---|
| Joncryl Emulsion J-1535 | 13.0% (as solid part) |
| Diethyleneglycol mono-n-butyl ether | 5.0% |
| Surfynol 485 | 1.0% |
| Substance (7) in Formula (I) | 10.0% |
| Glycerin | 5.0% |
| Trimetholol propano | 1.0% |
| Triethanolamine | 0.7% |
| Ion exchange water | Remainder |

The substance (7) in formula (I) is a mixture of 50% of a substance wherein R is a 1,3-dimethylbutyl group and 50% of a substance wherein R is an n-heptyl group, x is hydrogen in both, n is 3.0 and m is 1.0 in the 1,3-dimethylbutyl group substance, and n is 3.5 and m is 1.0 in the n-heptyl group substance.

The components noted above were thoroughly mixed and stirred in a vessel, and filtrated using a membrane filter having a pore size of 10 μm, to prepare a coating liquid (having a surface tension of 28 mN/m).

(5) Recording Preparation

Recording medium: Photo Paper (produced by Seiko-Epson Corporation)

Printer: PM 700C (produced by Seiko-Epson Corporation)

The image recording ink composition of example 20(3) and the coating liquid of example 20(4) were loaded, respectively, into the PM-700C and the recording 20 of example 20 was obtained by two recording head scans, namely a scan to form the image, and a scan to spray on the coating liquid.

The image density in recording 20 was very high, and visibility was outstanding. The drying speed after image recording was also very fast.

Example 21

(1) Surface Treated Pigment Preparation 20 parts isoindolinone pigment (C. I. pigment yellow 110) were mixed with 500 parts quinoline, and this was graded and dispersed for 2 hours with an Eiger Motor Mill M250 (produced by Eiger Japan) and with a bead packing ratio of 70% and a turning speed of 5,000 rpm. The mixture liquid of the graded and dispersed pigment paste and solvent was transferred to an evaporator and heated at 120° C. under a reduced pressure of 30 mm Hg to evaporate off as much of the moisture contained in the system as possible, after which temperature control was effected to 160° C. Next, 20 parts of a sulfonated pyridine complex were added as a reaction agent and this material was caused to react for 4 hours. After that reaction was complete, several washings were performed with excessive quinoline, then the material was poured into water and filtrated to yield surface-treated isoindolinone pigment particles.

(2) Pigment Dispersion Liquid Preparation

To 20 parts of the surface-treated isoindolinone pigment obtained in example 21(1) were added 2 parts triethanolamine as a neutralizing agent, and 78 parts ion exchange water. Using a paint shaker (using zirconia beads; bead packing ratio=60%; media diameter=1.7 mm), dispersion was effected until the mean particle diameter (secondary particle diameter) of the isoindolinone became 90 nm to yield a surface-treated isoindolinone pigment dispersion liquid. The absolute value of the zeta potential of the surface-treated isoindolinone pigment dispersion liquid obtained, at 20° C. and pH 8 to 9, was 50 mV.

(3) Preparation of Image Recording Ink Composition

| | |
|---|---|
| Pigment dispersion liquid of Example 21(2) | 30.0% |
| Glycerin | 15.0% |
| Triethylene glycol mono-n-butyl ether | 10.0% |
| Surfynol 465 | 1.2% |
| Triethanolamine | 0.3% |
| Substance (8) in formula (I) | 2.0% |
| Ion exchange water | Remainder |

In the substance (8) expressed in formula (I), R is a t-butyl group, x is —$SO_3M$ where M is an ammonium ion, n is 3.0, and m is 1.0.

The components noted above were thoroughly mixed and stirred in a vessel, and filtrated using a membrane filter having a pore size of 0.5 μm, to prepare an image recording ink composition (having a surface tension of 30 mN/m).

(4) Coating Liquid Preparation

In example 21, an acrylic acid copolymer emulsion (product name: Primal I-98, produced by Rohm and Haas Co.) was used for the fine polymer particle aqueous emulsion. Primal I-98 has an acid value of 100 and minimum film formation temperature of 26° C. or lower.

| | |
|---|---|
| Primal I-98 | 15.0% (as solid part) |
| Propylene glycol mono-n-butyl ether | 5.0% |
| Tetrapropylene glycol | 5.0% |
| Diethylene glycol | 5.0% |
| Surfynol 485 | 1.0% |
| Substance (9) in Formula (I) | 2.0% |
| Glycerin | 5.0% |
| Triethanolamine | 0.3% |
| Ion exchange water | Remainder |

The substance (9) expressed in formula (I) is a mixture of 50% of a substance wherein R is a neopentyl group, 30% of a substance wherein R an n-pentyl group, and 20% of a substance wherein R is an isopentyl group. In the neopentyl group substance, n is 1.0 and m is 0.3. In the n-pentyl group substance, n is 2.5 and m is 1.0. And in isopentyl group substance, n is 3.0 and m is 1.5.

The components noted above were thoroughly mixed and stirred in a vessel, and filtrated using a membrane filter having a pore size of 0.5 μm, to prepare a coating liquid (having a surface tension of 32 mN/m).

(5) Recording Preparation

Recording medium: Photo Paper (produced by Seiko-Epson Corporation)

Printer: PM-700C (produced by Seiko-Epson Corporation)

The image recording ink composition of example 21(3) and the coating liquid of example 21(4) were loaded, respectively, into the PM-700C and the recording 21 of example 21 was obtained by two recording head scans, namely a scan to form the image, and a scan to spray on the coating liquid.

The image density in recording 21 was very high, and visibility was outstanding. The drying speed after image recording was also very fast.

Example 22

(1) Pigment Dispersion Liquid Preparation 200 g of carbon black ("MA 100" produced by Mitsubishi Chemical Corporation) were mixed and dispersed in 1,000 g of water. Into this were dripped 400 g of sodium hypochlorite (12%). This was stirred for 10 hours at 90 to 110° C., then water washing and filtration were done repeatedly, after which 15 parts of wet cake of this pigment were placed in 75 parts ion exchange water, 10 parts of a 10% aqueous solution of sodium hydroxide were added, and dispersion was effected using a paint shaker (using zirconia beads; bead packing ratio=60%; media diameter=1.7 mm) until the mean particle diameter (secondary particle diameter) of the carbon black was 110 nm, to yield a 15 wt. % dispersion liquid of surface-treated carbon black having a carboxyl group and phenolic hydroxyl group in the surface thereof.

The absolute value of the zeta potential in the surface-treated carbon black dispersion liquid obtained, at 20° C. and pH 8 to 9, was 55 mV.

(2) Image Recording Ink Composition Preparation

| | |
|---|---|
| Pigment dispersion liquid of Example 22(1) | 50.0% |
| Ethylene glycol mono-n-butyl ether | 10.0% |
| Glycerin | 35.0% |
| Substance (1.0) expressed in formula (I) | 20.0% |
| Ion exchange water | Remainder |

In substance (10) expressed in formula (I), R is a t-butyl group, x is —$SO_3M$ where M is a sodium ion, n is 3.0, and m is 1.0.

The components noted above were mixed, then filtrated using a membrane filter having a pore size of 10 μm, to prepare an image recording ink composition (having a surface tension of 29 mN/m).

(3) Coating Liquid Preparation

In example 22, an acrylic acid-styrene copolymer emulsion (product name: Joncryl Emulsion J-352, produced by Johnson Polymer) was used for the fine polymer particle aqueous emulsion. J-352 has an acid value of 51 and minimum film formation temperature of 10° C.

| | |
|---|---|
| Joncryl Emulsion J-352 | 4.0% (as solid part) |
| Propylene glycol mono-n-butyl ether | 4.0% |

-continued

| | |
|---|---|
| Tetrapropylene glycol | 5.0% |
| Diethylene glycol | 5.0% |
| Surfynol 485 | 1.0% |
| Formula (I) substance (11) | 1.0% |
| Glycerin | 5.0% |
| Triethanolamine | 0.3% |
| Ion exchange water | Remainder |

In the substance (11) in formula (I), R is an n-octyl group, x is hydrogen, n is 5.0, and m is 1.0.

The components noted above were thoroughly mixed and stirred in a vessel, and filtrated using a membrane filter having a pore size of 10 μm, to prepare an image recording ink composition (having a surface tension of 33 mN/m).

(4) Recording Preparation

Recording medium: Photo Paper (produced by Seiko-Epson Corporation)

Printer: PM-700C (produced by Seiko-Epson Corporation)

The image recording ink composition of example 22(2) and the coating liquid of example 22(3) were loaded, respectively, into the PM-700C and the recording 22 of example 22 was obtained by two recording head scans, namely a scan to form the image, and a scan to spray on the coating liquid.

The image density in recording 22 was quite high, and visibility was outstanding. The drying speed after image recording was also very fast.

Example 23

(1) Pigment Dispersion Liquid Preparation 25 parts carbon black ("MA-77" produced by Mitsubishi Chemical Corporation) were mixed and dispersed in 500 parts water. The liquid obtained was subjected to a treatment for 2 hours, while stirring, with a gas containing ozone at an ozone concentration of 8 wt. %, at a flow rate of 500 cc/minute. Water washing and filtration were then done repeatedly to yield surface-treated carbon black pigment particles. Then 16 parts of the surface-treated carbon black pigment obtained, 76 parts ion exchange water, and 8 parts of a 10% aqueous solution of sodium hydroxide were mixed together, and dispersion was effected using a paint shaker (using zirconia beads; bead packing ratio=60%; media diameter=1.7 mm) until the mean particle diameter (secondary particle diameter) of the carbon black was 115 nm, to yield a 16 wt. % dispersion liquid of surface-treated carbon black. The absolute value of the zeta potential in the surface-treated carbon black dispersion liquid obtained, at 20° C. and pH 8 to 9, was 40 mV.

(2) Image Recording Ink Composition Preparation

| | |
|---|---|
| Pigment dispersion liquid of Example 23(1) | 40.0% |
| Ethylene glycol mono-n-butyl ether | 8.0% |
| Triethylene glycol | 5.0% |
| Glycerin | 10.0% |
| 1,2-pentanediol | 2.0% |
| Ion exchange water | Remainder |

The components noted above were mixed together, and then filtrated using a membrane filter having a pore size of 10 μm, to prepare an image recording ink composition (having a surface tension of 33 mN/m).

(3) Coating Liquid Preparation

In example 23, a styrene-acrylic acid copolymer emulsion (product name: Joncryl Emulsion J-734, produced by Johnson Polymer) was used for the fine polymer particle aqueous emulsion. J-734 has an acid value of 87 and minimum film formation temperature of 5° C. or lower.

| | |
|---|---|
| Joncryl Emulsion J-734 | 12.0% (as solid part) |
| Propylene glycol mono-n-butyl ether | 2.0% |
| Tetrapropylene glycol | 5.0% |
| Diethylene glycol | 5.0% |
| Surfynol 485 | 1.0% |
| Formula (I) substance (12) | 2.0% |
| Glycerin | 5.0% |
| Triethanolamine | 0.3% |
| Ion exchange water | Remainder |

In the substance (12) in formula (I), R is an n-hexyl group, X is hydrogen, n is 4.0, and m is 3.0.

The components noted above were thoroughly mixed and stirred in a vessel, and filtrated using a membrane filter having a pore size of 10 μm, to prepare a coating liquid (having a surface tension of 35 mN/m).

(4) Recording Preparation

Recording medium: Photo Paper (produced by Seiko-Epson Corporation)

Printer: PM-700C (produced by Seiko-Epson Corporation)

The image recording ink composition of example 23(2) and the coating liquid of example 23(3) were loaded, respectively, into the PM-700C and the recording 23 of example 23 was obtained by two recording head scans, namely a scan to form the image, and a scan to spray on the coating liquid.

The image density in recording 23 was quite high, and visibility was outstanding. The drying speed after image recording was also very fast.

Example 24

(1) Pigment Dispersion Liquid Preparation 15 g of carbon black ("MA-100" produced by Mitsubishi Chemical Corporation) and 5 g of p-amino-N-benzoic acid were mixed and dispersed in 110 g of water. Into this were dripped 2.4 g of nitric acid, and stirring was done for 5 minutes at 70° C. An aqueous solution of sodium nitrite was added and, after stirring for another 2 hours, water washing and filtration were done repeatedly to yield surface-treated carbon black pigment particles. Then 12 parts of the surface-treated carbon black pigment obtained, 8 parts of a 10% aqueous solution of sodium hydroxide, and 80 parts ion exchange water were mixed together, and dispersion was effected using a paint shaker (using zirconia beads; bead packing ratio=60%; media diameter=1.7 mm) until the mean particle diameter (secondary particle diameter) of the carbon black was 110 nm, to yield a 12 wt. % dispersion liquid of surface-treated carbon black having a sulfone group bonded to the surface thereof through a phenyl group. The absolute value of the zeta potential in the surface-treated carbon black dispersion liquid obtained, at 20° C. and pH 8 to 9, was 35 mV.

(2) Preparation of Image Recording Ink Composition

| | |
|---|---|
| Pigment dispersion liquid of Example 24(1) | 60.0% |
| Triethylene glycol mono-n-butyl ether | 2.0% |
| Glycerin | 9.0% |
| Diethylene glycol | 4.0% |
| 2-pyrrolidone | 5.0% |
| 1,2-pentanediol | 2.0% |
| Surfynol TG | 0.5% |
| Substance (13) expressed in formula (I) | 2.0% |
| Ion exchange water | Remainder |

In the substance (13) expressed in formula (I), R is an n-pentyl group, X is hydrogen, n is 3.0, and m is 1.0.

The components noted above were mixed together, then filtrated using a membrane filter having a pore size of 10 μm, to prepare an image recording ink composition (having a surface tension of 35 mN/m).

(3) Coating Liquid Preparation

In example 24, a styrene-acrylic acid copolymer emulsion (product name: Joncryl Emulsion J-780, produced by Johnson Polymer) was used for the fine polymer particle aqueous emulsion. J-780 has an acid value of 46 and minimum film formation temperature of 50° C. or higher.

| | |
|---|---|
| Joncryl Emulsion J-780 | 1.0% (as solid part) |
| Triethylene glycol mono-n-butyl ether | 1.0% |
| Tetraethylene glycol | 5.0% |
| Diethylene glycol | 5.0% |
| Surfynol 485 | 1.0% |
| Formula (I) substance (14) | 1.0% |
| Glycerin | 5.0% |
| Triethanolamine | 0.3% |
| Ion exchange water | Remainder |

In the substance (14) in formula (I), R is a t-butyl group, X is hydrogen, n is 3.0, and m is 2.0.

The components noted above were thoroughly mixed and stirred in a vessel, and filtrated using a membrane filter having a pore size of 10 μm, to prepare a coating liquid (having a surface tension of 32 mN/m).

(4) Recording Preparation

Recording medium: Photo Paper (produced by Seiko-Epson Corporation)

Printer: PM-700C (produced by Seiko-Epson Corporation)

The image recording ink composition of example 24(2) and the coating liquid of example 24(3) were loaded, respectively, into the PM-700C and the recording 24 of example 24 was obtained by two recording head scans, namely a scan to form the image, and a scan to spray on the coating liquid.

The image density in recording 24 was quite high, and visibility was outstanding. The drying speed after image recording was also very fast.

Example 25

(1) Pigment Dispersion Liquid Preparation

Keeping a solution wherein anthranilic acid was added to a concentrated aqueous solution of hydrochloric acid continually at 10° C. or lower, an aqueous solution of sodium nitrite wherein 2 g of sodium nitrite was added to 10 g of water at 5° C. was added, and, while stirring for 20 minutes, 25 g of carbon black ("MA-100" produced by Mitsubishi Chemical Corporation) was mixed in and dispersed. Stirring was done for an additional 30 minutes. Then water washing and filtration were done repeatedly to yield surface-treated carbon black pigment particles. Then 10 parts of the surface-treated carbon black pigment obtained, 2 parts triethanolamine, and 88 parts ion exchange water were mixed together, and dispersion was effected using a paint shaker (using zirconia beads; bead packing ratio=60%; media diameter=1.7 mm) until the mean particle diameter (secondary particle diameter) of the carbon black was 100 nm, to yield a 10 wt. % surface-treated carbon black dispersion liquid. Wet cake of this pigment was then re-dispersed in water, and stirred with a stirrer to yield a 10 wt. % dispersion liquid of surface-treated carbon black having a carboxyl group bonded to the surface thereof through a phenyl group.

The zeta potential of the surface-treated carbon black dispersion liquid obtained, at 20° C. and pH 8 to 9, was 38 mV.

(2) Image Recording Ink Composition Preparation

| | |
|---|---|
| Pigment dispersion liquid of Example 25(1) | 50.0% |
| Propylene glycol mono-n-butyl ether | 3.0% |
| Glycerin | 10.0% |
| 1,2-hexanediol | 2.0% |
| Triethylene glycol | 8.0% |
| Ion exchange water | Remainder |

The components noted above were mixed together, and then filtrated using a membrane filter having a pore size of 10 μm, to prepare an image recording ink composition (having a surface tension of 35 mN/m).

(3) Coating Liquid Preparation

In example 25, two styrene-acrylic acid copolymer emulsions (product names: Joncryl Emulsion J-390 and Joncryl Emulsion J-780, both produced by Johnson Polymer) were used for the fine polymer particle aqueous emulsion.

| | |
|---|---|
| Joncryl Emulsion J-390 | 30.0% (as solid part) |
| Joncryl Emulsion J-780 | 10.0% (as solid part) |
| Ethylene glycol mono-n-butyl ether | 5.0% |
| Surfynol 485 | 1.0% |
| Glycerin | 5.0% |
| Triethanolamine | 0.3% |
| Ion exchange water | Remainder |

The components noted above were thoroughly mixed and stirred in a vessel, and filtrated using a membrane filter having a pore size of 10 μm, to prepare a coating liquid (having a surface tension of 35 mN/m).

(4) Recording Preparation

Recording medium: Photo Paper (produced by Seiko-Epson Corporation)

printer: PM-700C (produced by Seiko-Epson Corporation)

The image recording ink composition of example 25(2) and the coating liquid of example 25(3) were loaded, respectively, into the PM-700C and the recording 25 of example 25 was obtained by two recording head scans, namely a scan to form the image, and a scan to spray on the coating liquid.

The image density in recording 25 was quite high, and visibility was outstanding. The drying speed after image recording was also very fast.

Example 26

(1) Pigment Dispersion Liquid Preparation 20 g of carbon black ("MA-100" produced by Mitsubishi Chemical Corporation) and 62 g of p-amino-N-ethylpyridinium bromide were mixed and dispersed in 150 g of water. Into this were dripped 32 g of nitric acid, and stirring was done for 5 minutes at 75° C. An aqueous solution of sodium nitrite was added and, after stirring for another 2 hours, water washing and filtration were done repeatedly to yield surface-treated carbon black pigment particles. Then 10 parts of the surface-treated carbon black pigment obtained, 2 parts triethanolamine, and 88 parts ion exchange water were mixed together, and dispersion was effected using a paint shaker (using zirconia beads; bead packing ratio=60%; media diameter=1.7 mm) until the mean particle diameter (secondary particle diameter) of the carbon black was 100 nm, to yield a 10 wt. % dispersion liquid of surface-treated carbon black having an N-ethylpyridyl group bonded to the surface thereof. The absolute value of the zeta potential in the surface-treated carbon black dispersion liquid obtained, at 20° C. and pH 8 to 9, was 41 mV.

(2) Image Recording Ink Composition Preparation

| | |
|---|---|
| Pigment dispersion liquid of Example 26(1) | 65.0% |
| Ethylene glycol mono-n-butyl ether | 5.0% |
| Glycerin | 15.0% |
| 1,2-hexanediol | 2.0% |
| 2-pyrrolidone | 4.0% |
| Ion exchange water | Remainder |

The components noted above were mixed together, and then filtrated using a membrane filter having a pore size of 10 μm, to prepare an image recording ink composition (having a surface tension of 33 mN/m).

(3) Coating Liquid Preparation

In example 26, a styrene-acrylic acid copolymer emulsion (product name: Joncryl Emulsion J-840, produced by Johnson Polymer) was used for the fine polymer particle aqueous emulsion. J-840 has an acid value of 87 and minimum film formation temperature of 5° C. or lower.

| | |
|---|---|
| Joncryl Emulsion J-840 | 20.0% (as solid part) |
| Triethylene glycol mono-n-butyl ether | 8.0% |
| Triethylene glycol | 8.0% |
| Surfynol 485 | 1.0% |
| 1,5-pentanediol | 2.5% |
| Glycerin | 5.0% |
| Triethanolamine | 0.3% |
| Ion exchange water | Remainder |

The components noted above were thoroughly mixed and stirred in a vessel, and filtrated using a membrane filter having a pore size of 10 μm, to prepare a coating liquid (having a surface tension of 30 mN/m).

(4) Recording Preparation

Recording medium: Photo Paper (produced by Seiko-Epson Corporation)

Printer: PM-700C (produced by Seiko-Epson Corporation)

The image recording ink composition of example 26(2) and the coating liquid of example 26(3) were loaded, respectively, into the PM-700C and the recording 26 of example 26 was obtained by two recording head scans, namely a scan to form the image, and a scan to spray on the coating liquid.

The image density in recording 26 was quite high, and visibility was outstanding. The drying speed after image recording was sufficiently fast.

Example 27

In example 27, the image recording ink composition prepared in example 4(3) is used as is.

(2) Emulsion Preparation

Into a reaction vessel equipped with a stirrer, reflux cooling tube, dropping funnel, thermometer, and nitrogen induction tube were introduced 20 parts of a methylethyl ketone as a polymerization solvent, and, for the polymer unsaturated monomer(s), 12 parts t-butyl methacrylate, 2 parts polyethylene glycol methacrylate, 5 parts acrylic acid, 1 part Silicon Macromer FM-0711 (product name, produced by Chisso Corporation), and 0.6 part n-dodecyl mercaptan, and thorough nitrogen gas replacement was performed. Meanwhile, into the dropping funnel, after thorough nitrogen replacement had been performed, were put 48 parts t-butyl methacrylate, 8 parts polyethylene glycol methacrylate, 20 parts acrylic acid, 4 parts Silicon Macromer FM-0711 (product name, produced by Chisso Corporation), 2.4 parts n-dodecyl mercaptan, 60 parts methylethyl ketone, and 0.2 part 2,2'azobis(2,4-dimethyl valeronitrile).

The mixture solution in the reaction vessel was raised to a temperature of 65° C. while stirring under a nitrogen atmosphere, and the mixture solution in the dropping funnel was gradually dripped in over a 3-hour time period. Then, 2 hours after the completion of the drip, 0.1 part 2,2'azobis (2,4-dimethyl valeronitrile) was dissolved in 5 parts of a methylethyl ketone, that solution was further added, aging was effected for 2 hours at 65° C., and then for 2 hours at 70° C., to yield the emulsion solution.

To the emulsion solution so obtained were added 1,000 parts acetone. While stirring, 98 parts of a 30% aqueous solution of ammonia were added, and the salt generating groups in the emulsion were partially neutralized. Then, after adding 1,500 parts ion exchange water, the methylethyl ketone and acetone were completely removed under reduced pressure at 60° C., and some of the water was also removed, thereby concentrating the solution and yielding an aqueous emulsion of fine polymer particles having a solid part concentration of 50 wt. %. This was made emulsion C. The minimum film formation temperature of this fine polymer particle emulsion was 130° C. and the acid value was 53.

(3) Coating Liquid Preparation

| | |
|---|---|
| Emulsion of Example 27(2) | 10.0% (as solid part) |
| Glycerin | 15.0% |
| Triethylene glycol | 5.0% |
| Triethanolamine | 1.0% |
| Triethylene glycol mono-n-butyl ether | 1.0% |
| 1,2-hexanediol | 3.0% |
| 2-pyrrolidone | 2.0% |
| Surfynol 465 | 0.5% |
| Surfynol 104 | 0.1% |
| Ion exchange water | Remainder |

The components noted above were thoroughly mixed and stirred in a vessel, and filtrated using a membrane filter having a pore size of 10 μm, to prepare a coating liquid (having a surface tension of 31 mN/m).

(4) Recording Preparation

Recording medium: Photo Paper (produced by Seiko-Epson Corporation)

Printer: PM-700C (produced by Seiko-Epson Corporation)

The image recording ink composition of example 4(3) and the coating liquid of example 27(3) were loaded, respectively, into the PM-700C and the recording 27 of example 27 was obtained by two recording head scans, namely a scan to form the image, and a scan to spray on the coating liquid.

The image density in recording 27 was very high, and visibility was outstanding. The drying speed was also very fast.

Example 28

(1) Image Recording Ink Composition Preparation

In example 28, the image recording ink compositions prepared in example 17(3), 19(3), 20(3), and 21(3) were used as is.

(2) Coating Liquid Preparation

In example 28, the coating liquid prepared in example 20(4) was used as is.

(3) Recording Preparation

Recording medium: Photo Paper (produced by Seiko-Epson Corporation)

Printer: PM-700C (produced by Seiko-Epson Corporation)

The image recording ink compositions of example 17(3), example 19(3), example 20(3), and example 21(3), and the coating liquid of example 20(4) were loaded, respectively, into the PM-700C and the recording 28 of example 28 was obtained by two recording head scans, namely a scan to form the image, and a scan to spray on the coating liquid.

The image density in recording 28 was very high, and visibility was outstanding. The drying speed was also very fast. Moreover, the image was brilliant, with no ink bleed, even in portions of the image where inks of two or more colors touched or overlapped.

Comparative Example 1

(1) Coating Liquid Preparation

In comparative example 1, a styrene-acrylic acid copolymer emulsion (product name: Joncryl 679, produced by Johnson Polymer) was used as the fine polymer particle aqueous emulsion. The average molecular weight in Joncryl 679 is 7,000. The minimum film formation temperature of this fine polymer particle emulsion is 90° C., and the acid value is 200. No penetrating agent was added in the coating liquid in comparative example 1.

| | |
|---|---|
| Joncryl 679 | 10.0% (as solid part) |
| Glycerin | 10.0% |
| 10% sodium hydroxide aqueous solution | 2.0% |
| Ion exchange water | Remainder |

The components noted above were thoroughly mixed and stirred in a vessel, and filtrated using a membrane filter having a pore size of 10 μm, to prepare a coating liquid (having a surface tension of 55 mN/m).

(2) Recording Preparation

Recording medium: Photo Paper (produced by Seiko-Epson Corporation)

Printer: PM-700C (produced by Seiko-Epson Corporation)

The image recording ink composition prepared in example 1(1) and the coating liquid of comparative example 1(1) were loaded, respectively, into the PM-700C and the recording 29 of comparative example 1 was obtained by two recording head scans, namely a scan to form the image, and a scan to spray on the coating liquid.

Comparative Example 2

Recording medium: Photo Paper (produced by Seiko-Epson Corporation)

Printer: PM-700C (produced by Seiko-Epson Corporation)

Only the image recording ink composition prepared in example 11(3) was loaded into the PM-700C and an image was formed to yield recording 30 of comparative example 2, without applying a coating.

Comparative Example 3

(1) Coating Liquid Preparation

In comparative example 3, an acrylic based emulsion (product name: Primal AC-490, produced by Rohm and Haas Co.) was used for the fine polymer particle aqueous emulsion. The minimum film formation temperature of this fine polymer particle emulsion was 18° C. No penetrating agent was added in this coating liquid in comparative example 3.

| | |
|---|---|
| Primal AC-490 | 10.0% (as solid part) |
| Glycerin | 10.0% |
| Triethanolamine | 0.3% |
| Ion exchange water | Remainder |

The components noted above were thoroughly mixed and stirred in a vessel, and filtrated using a membrane filter having a pore size of 10 μm, to prepare a coating liquid (having a surface tension of 61 mN/m).

(2) Recording Preparation

Recording medium: Photo Paper (produced by Seiko-Epson Corporation)

Printer: PM-700C (produced by Seiko-Epson Corporation)

The image recording ink composition prepared in example 11(3) and the coating liquid of comparative example 3(1) were loaded, respectively, into the PM-700C and the recording 31 of comparative example 3 was obtained by two recording head scans, namely a scan to form the image, and a scan to spray on the coating liquid.

Comparative Example 4

(1) Coating Liquid Preparation

In comparative example 4, an acrylic acid based emulsion (product name: Primal E-2014, produced by Rohm and Haas Co.) was used for the fine polymer particle aqueous emulsion, but no penetrating agent was added after that. The acid value of Primal E-2014 is 160 and the minimum film formation temperature is 48° C.

| | |
|---|---|
| Primal E-2014 | 13.0% (as solid part) |
| Glycerin | 10.0% |
| Ion exchange water | Remainder |

The components noted above were thoroughly mixed and stirred in a vessel, and filtrated using a membrane filter having a pore size of 0.5 μm, to prepare a coating liquid (having a surface tension of 65 mN/m).

(2) Recording Preparation

The image recording ink composition prepared in example 24(2) and the coating liquid of comparative example 4(1) were loaded, respectively, into the PM-700C and the recording 32 of comparative example 4 was obtained by two recording head scans, namely a scan to form the image, and a scan to spray on the coating liquid.

(Recording Evaluation)

Evaluations were made by the methods described below using the recordings 1 to 32 obtained with examples 1 to 28 of the present invention and comparative examples 1 to 4.

Light Resistance Evaluation

Using a xenon fade tester XF-15 (produced by Shimadzu Corporation), light resistance was evaluated under light irradiation for 50 hours at 60° C. and 70% RH. The L*a*b* color difference (ΔE) was measured with a chromatic color difference meter CR-121 (produced by Minolta). The evaluation criteria used are as follows.

Evaluation A: $\Delta E \leqq 15$

B: $15 < \Delta E < 30$

C: $\Delta E \geqq 30$

Water Resistance Evaluation:

Each recording, after being dried in blowing air for 1 hour following image formation, was immersed in water for 15 seconds and removed. Ink running in the image portion was then observed with the naked eye. The evaluation criteria used are as follows.

Evaluation A: No ink running whatsoever

B: Slight ink running

C: Ink running present, but image can be read

D: Pronounced ink running; very difficult to read image

Fixation Evaluation

Each recording, after being dried in blowing air for 1 hour following image formation, was subjected to rubbing at the Paper edges, whereupon visual observations were made of image distortion such as smearing or coating layer peeling. The evaluation criteria used were as follows.

Evaluation A: Absolutely no smearing or coating layer peeling even with strong rubbing.

B: Almost no smearing or coating layer peeling even with some rubbing

C: Slight smearing and/or coating layer peeling when rubbed, but at a level presenting no problem in practice D: Upon rubbing, smearing and/or coating layer peeling reaches a level that is problematic in practice Glossiness Evaluation The glossiness of each recording was evaluated by visual observation. A represents the heat glossiness. B and C represent poor glossiness, in that order. D is the worst level.

Quick-Drying Property Evaluation

Using the ink jet recording apparatus PM-700C (produced by Seiko-Epson Corporation) 50-point text characters were recorded on ordinary Paper with combinations of the image recording ink compositions and coating liquids of examples 1 to 28 and comparative examples 1 to 4 described in the foregoing. After the recording, the same type of ordinary Paper was superimposed on the recordings, and the time elapsed until discoloration ceased to appear in the superimposed Paper was measured, at 5-second intervals. The evaluation criteria used are as follows.

Evaluation A: Discoloration ceases to appear in 10 seconds or less.

B: Discoloration ceases to appear in 20 seconds or less.

C: Discoloration ceases to appear in 30 seconds or less.

D: Discoloration continues to appear even after 30 seconds.

The results of the evaluations described above are noted in Table 1.

TABLE 1

| | Light resistance | Water resistance | Fixation | Glossiness | Quick-drying property |
|---|---|---|---|---|---|
| Example 1 | B | C | B | A | C |
| Example 2 | A | B | B | A | B |
| Example 3 | A | A | A | A | A |
| Example 4 | A | A | A | A | A |
| Example 5 | A | B | A | A | A |
| Example 6 | A | A | A | A | A |
| Example 7 | A | A | A | A | A |
| Example 8 | A | A | A | A | A |
| Example 9 | A | A | A | A | A |
| Example 10 | A | A | A | A | A |
| Example 11 | A | A | A | A | A |
| Example 12 | A | B | B | C | A |
| Example 13 | A | A | A | A | B |
| Example 14 | B | B | A | A | B |
| Example 15 | A | B | A | B | A |
| Example 16 | B | B | A | A | A |
| Example 17 | A | A | A | A | A |
| Example 18 | A | D | A | A | A |
| Example 19 | A | A | A | A | A |
| Example 20 | A | A | A | A | A |
| Example 21 | A | A | A | A | A |
| Example 22 | A | A | A | A | A |
| Example 23 | A | A | A | A | A |
| Example 24 | A | B | B | C | A |
| Example 25 | A | A | A | A | B |
| Example 26 | A | A | A | A | A |
| Example 27 | A | A | A | A | A |
| Example 28 | A | A | A | A | A |
| Comparative example 1 | C | D | C | C | D |
| Comparative example 2 | A | C | D | D | A |
| Comparative example 3 | A | B | C | C | D |
| Comparative example 4 | A | B | D | D | D |

As is evident from Table 1, the recordings in which the coating liquid of the present invention is used exhibit good light resistance, water resistance, fixation, and glossiness, and, in the examples wherein a surface-treated pigment is used for the colorant in the image recording ink composition, greater quick-drying properties are exhibited, and high image quality is realized with high image density. Moreover, the recordings wherein an aqueous emulsion having an acid value of 100 or lower and a minimum film formation temperature of room temperature or lower is used as the fine polymer particles in the coating liquid, and a surface-treated pigment is used as the colorant in the image recording ink composition, evidence no ink running even when immersed for a long time (10 minutes) in running water, thus exhibiting exceptional water resistance.

Compared thereto, with comparative example 1, because only water, a humectant, and a water-soluble resin having an acid value larger than 100 and a minimum film formation temperature higher than room temperature were used, it was not possible to impart adequate fixation, glossiness, water resistance, or light resistance to the recordings, and the image drying speed was slow. With comparative example 2, because no coating liquid was applied, adequate water resistance, fixation, and glossiness could not be imparted to the recordings. With comparative example 3, despite the fact that fine polymer particles having a minimum film formation temperature of room temperature or lower were used in the coating liquid, only water and a humectant were used besides, wherefore adequate glossiness and fixation could not be imparted to the recordings, and image drying speed was slow. And with comparative example 4, because only fine polymer particles having an acid value larger than 100 and a minimum film formation temperature higher than room temperature were used together with water and a humectant in the coating liquid, glossiness and fixation could not be imparted to the recordings, and image drying speed was slow.

In examples 1, 2, 24, 25, and 27, described in the foregoing, despite the fact that fine polymer particles having a minimum film formation temperature higher than room temperature are used in the coating liquid, adequate water resistance and fixation could be imparted to the recordings. That is though to be due to the addition into the coating liquid of a penetrating agent such as a glycol ether or the like according to the present invention, and to the fact that the film formation temperature of the actual coating liquid is lower than the minimum film formation temperature of the fine polymer particle elements.

(Effectiveness of Invention)

As described in the foregoing, the coating liquid based on the present invention, the image recording method using the same, and recordings recorded thereby are able to impart such fastness properties as fixation, water resistance, and light resistance to the recordings, as well as good image quality with outstanding glossiness, without requiring processes for hardening and fixing a coating layer by heating or UV radiation or the like, long considered problematic.

Furthermore, the recording method wherein an ink containing a surface-treated pigment as the colorant is used, and recordings that are recorded thereby, facilitate making recordings that, in addition to exhibiting the characteristics noted above, exhibit quick-drying properties and high image quality with high image density, and also are able to improve fixation and/or rubbing resistance.

What is claimed is:

1. A coating liquid comprising components that provide a transparent topcoat to a recorded image coated with the coating liquid, said components comprising:

at least water, fine polymer particles, a penetrating agent and at least one substance having a structure represented by formula (I):

R-EOn-POm-X formula (I)

where R represents an alkyl group having 1 to 12 carbons, structure of which may be either a straight chain or branched; X represents —H or —SO3M; where M is a counter ion that is a hydrogen ion, alkaline metal ion, ammonium ion, or organic ammonium ion; EO represents an ethylene oxy group; PO represents a propylene oxy group; n and m are repeating units, indicating mean values in the substance of formula (I); EO and PO indicate presence in the substance, with order thereof being irrelevant, said coating liquid having a surface tension at 20° C. that is 40 mN/m or less.

2. The coating liquid according to claim 1, wherein said penetrating agent is one or two or more substances selected from the group consisting of acetylene glycol surfactants, acetylene alcohol surfactants, glycol ethers, and 1, 2-alkylene glycols.

3. The coating liquid according to claim 2, wherein said penetrating agent is an acetylene glycol surfactant and/or acetylene alcohol surfactant; in said acetylene glycol surfactant, an average of 30 or fewer ethylene oxy groups and/or propylene oxy groups have been added to 2,4,7,9-tetramethyl-5-decine-4,7-diol, 3,6-dimethyl-4-octene-3,6,-diol, or 2,4,7,9-tetramethyl-5-decine-4,7-diol, 3,6-dimethyl-4-octene-3,6-diol; and in said acetylene alcohol surfactant, an average of 30 or fewer ethylene oxy groups and/or propylene oxy groups have been added to 2,4-dimethyl-5-hexene-3-ol, or 2,4-dimethyl-5-hexene-3-ol.

4. The coating liquid according to claim 2, wherein said penetrating agent is a glycol ether, and said glycol ether is ethylene glycol mono(alkyl having 4–8 carbons) ether, triethylene glycol mono(alkyl having 4–8 carbons) ether, propylene glycol mono(alkyl having 3–6 carbons) ether, or dipropylene glycol mono(alkyl having 3–6 carbons) ether.

5. The coating liquid according to claim 2, wherein said penetrating agent is a 1,2-alkylene glycol, and that 1,2-alkylene glycol is 1,2-(alkyl having 4–10 carbons) diol.

6. The coating liquid according to claim 2, wherein said penetrating agent is an acetylene glycol surfactant and/or acetylene alcohol surfactant, and quantity thereof contained is 0.1 to 5.0 wt. %.

7. The coating liquid according to claim 2, wherein said penetrating agent is a glycol ether, and quantity thereof contained is 0.5 to 30 wt. %.

8. The coating liquid according to claim 2, wherein said penetrating agent is a 1,2-alkylene glycol, and quantity thereof contained is 0.5 to 30 wt. %.

9. The coating liquid according to claim 1, wherein quantity of said fine polymer particles contained is within range of 1 to 40 wt. %.

10. The coating liquid according to claim 1, wherein a minimum film formation temperature of said fine polymer particles is 20° C. or lower.

11. A The coating liquid according to claim 1, wherein said fine polymer particles are used as an aqueous emulsion configured only of a resin or resins having an acid value of 100 or less.

12. The coating liquid according to claim 1, wherein R indicated in said formula (I) is an alkyl group having 4 to 10 carbons.

13. The coating liquid according to claim 1, wherein the substance expressed in said formula (I) is a substance where R is a butyl group; pentyl group, hexyl group, heptyl group, octyl group, nonyl group, or decyl group.

14. The coating liquid according to claim 1, wherein the substance expressed in said formula (I) has as its main component at least one substance expressed in formula (I) where R is a buytl group selected from among n-butyl, isobutyl, and t-butyl groups, or has as its main component at least one substance expressed in formula (I) where R is a pentyl group selected from among n-pentyl group and other isomers, or has as its main component at least one substance expressed in formula (I) where R is a hexyl group selected from among n-hexyl group and other isomers, or has as its main component at least one substance expressed in formula (I) where R is a heptyl group selected from among n-heptyl group and other isomers, or has as its main component at least one substance expressed in formula (I) wherein R is an octyl group selected from among n-octyl group and other isomers, or has as its main component as least one substance expressed in formula (I) where R is a nonyl group selected from among n-nonyl group and other isomers, or has as its main component at least one substance expressed in formula (I) where R is a decyl group selected from among n-decyl group and other isomers.

15. The coating liquid according to claim 1, wherein, in the substance expressed in said formula (I), n is 0 to 10, and m is 1to 5.

16. The coating liquid according to claim 1, wherein the substance expressed in said formula (I) has an average molecular weight of 2,000 or less.

17. The coating liquid according to claim 1, wherein the substance expressed in said formula (I) is contained in an amount of 0.5 to 30 wt. %.

18. An image recording method, wherein coating liquid described in 1 is discharged onto at least image portion of a recording medium using an ink jet head to form a coating.

19. The image recording method according to claim 18, wherein image to which said coat is applied was formed by discharging an ink composition onto a recording medium using an ink jet head.

20. The image recording method according to claim 18, wherein said ink composition contains at least water, a colorant, and a penetrating agent.

21. The image recording method according to claim 20, wherein said colorant is a dye.

22. The image recording method according to claim 20, wherein said colorant is a pigment.

23. The image recording method according to claim 22, wherein said pigment is made dispersible and/or soluble in water by a dispersant.

24. The image recording method according to claim 22, wherein said pigment is surface-treated so that at least one of functional groups represented by the formulae below, or salts thereof, is bonded either directly or with a polyvalent group intervening, to surface thereof, and is made dispersible and/or soluble in water without a dispersant;

—OM, —COOM, —CO—, —$SO_3M$, —$SO_2NH_2$,—$RSO_2M$, —$PO_3HM$, —$PO_3M_2$, —$SO_2NHCOR$, —$NH_3$, —$NR_3$ (where M is a hydrogen atom, alkaline metal, ammonium, or organic ammonium, and R is an alkyl group having 1 to 12 carbons, a phenyl group that may have a substituent group, or a naphthyl group that may have a substituent group).

25. The image recording method according to claim 24, wherein said polyvalent group is an alkyl group having 1 to 12 carbons, a phenyl group that may have a substituent group, or a naphthyl group that may have a substituent group.

26. The image recording method according to claim 24, wherein said pigment is surface-treated with a treatment agent containing sulfur so that $SO_3M$ and/or —$RSO_2M$ (where M is a counter ion that is a hydrogen ion, alkaline metal ion, an ammonium ion, or an organic ammonium ion) is chemically bonded to surface of particles thereof, and made dispersible and/or soluble in water.

27. The image recording method according to claim 24, wherein said liquid in which said surface-treated pigment is dispersed exhibits a zeta potential having an absolute value of 30 mV or greater at 20° C. and pH 8 to 9.

28. The image recording method according to claim 20, wherein said penetrating agent is one or two or more substances selected from a group consisting of acetylene glycol surfactants, acetylene alcohol surfactants, glycol ethers, and 1,2-alkylene glycols.

29. The image recording method according to claim 28, wherein: said penetrating agent is an acetylene glycol surfactant and/or an acetylene alcohol surfactant; in said acetylene glycol surfactant, on average 30 or fewer ethylene oxy groups and/or propylene oxy groups are added to 2,4,7,9-tetramethyl-5-decine-4,7-diol, 3,6-dimethyl-4-octine-3,6-diol, or 2,4,7,9-tetramethyl-5-decine-4,7 diol, 3,6-dimethyl-4-octine-3,6-diol; and in said acetylene alcohol surfactant, on average 30 or fewer ethylene oxy groups and/or propylene oxy groups are added to 2,4-dimethyl-5-hexine-3-ol or 2,4-dimethyl-5-hexine-3-ol.

30. The image recording method according to claim 28, wherein said penetrating agent is a glycol ether, and that glycol ether is diethylene glycol mono(alkyl having 4 to 8 carbons) ether, triethylene glycol mono(alkyl having 4 to 8 carbons) ether, propylene glycol mono(alkyl having 3 to 6 carbons), or dipropylene glycol mono(alkyl having 3 to 6 carbons) ether.

31. The image recording method according to claim 28, wherein said penetrating agent is a 1,2-alkylene glycol, and that 1,2-alkylene glycol is a 1,2-(alkyl having 4 to 10 carbons) diol.

32. The image recording method according to claim 28, wherein said penetrating agent is an acetylene glycol surfactant or acetylene alcohol surfactant, contained in an amount of 0.1 to 3.0 wt. %.

33. The image recording method according to claim 28, wherein said penetrating agent is a glycol ether, contained in an amount of 0.5 to 30 wt. %.

34. The image recording method according to claim 28, wherein said penetrating agent is a 1,2-alkylene glycol, contained in an amount of 0.5 to 30 wt. %.

35. The image recording method according to claim 19, wherein surface tension of said ink composition at 20° C. is 40 mN/m or less.

36. The image recording method according to claim 19, wherein at least one substance having a structure represented by formula (I) below is contained in said ink composition:

R-EOn-POm-X (I)

where R is an alkyl group having 1 to 12 carbons, structure of which may be a straight chain or branched structure; X is —H or SO3M (where M is a counter ion that is a hydrogen ion, alkaline metal ion, ammonium ion, or organic ammonium ion); EO is an ethylene oxy group; PO is a propylene oxy group; n and m are repeating units, representing mean values in one of substances expressed in formula (I); and EO and PO indicate presence in molecule, with order thereof being irrelevant.)

37. The image recording method according to claim 36, wherein R in said formula (I) is an alkyl group having 4 to 10 carbons.

38. The image recording method according to claim 36, wherein, in the substance expressed by said formula (I), R is a butyl group, pentyl group, hexyl group, heptyl group, octyl group, nonyl group, or decyl group.

39. The image recording method according to claim 36, wherein the substance expressed in said formula (I) has as its main component at least one substance expressed in formula (I) wherein R is a butyl group selected from among n-butyl, isobutyl, and t-butyl groups, or has as its main component at least one substance expressed in formula (I) wherein R is a pentyl group selected from among n-pentyl group and other isomers, or has as its main component at least one substance expressed in formula (I) wherein R is a hexyl group selected from among n-hexyl group and other isomers, or has as its main component at least one substance expressed in formula (I) wherein R is a heptyl group selected from among n-heptyl group and other isomers, or has as its main component at least one substance expressed in formula (I) wherein R is an octyl group selected from among n-octyl group and other isomers, or has as its main component at least one substance expressed in formula (I) wherein R is a nonyl group selected from among n-nonyl group and other isomers, or has as its main component at least one substance expressed in formula (I) wherein R is a decyl group selected from among n-decyl group and other isomers.

40. The image recording method according to claim 36, wherein the substance expressed in said formula (I) is a substance in which n is 0 to 10, and m is 1 to 5.

41. The image recording method according to claim 36, wherein the substance expressed in said formula (I) has an average molecular weight of 2,000 or less.

42. The image recording method according to claim 36, wherein the substance expressed in said formula (I) is contained in an amount of 0.5 to 30 wt. %.

43. The coating liquid according to claim 1, wherein the components provide a gloss to a recorded image coated with the liquid, said coating liquid consisting essentially of water, said fine polymer particles, said penetrating agent and said substance having the structure represented in formula (I).

* * * * *